(12) United States Patent
Schneur et al.

(10) Patent No.: US 8,036,950 B1
(45) Date of Patent: Oct. 11, 2011

(54) AUCTION MANAGEMENT WITH BUSINESS-VOLUME DISCOUNT

(75) Inventors: Avner Schneur, Lexington, MA (US); Rina Rotshild Schneur, Lexington, MA (US); Ge Li, Austin, TX (US); Charles H. Rosa, Waltham, MA (US)

(73) Assignee: Emptoris, Inc., Burlington, MA (US)

( * ) Notice: Subject to any disclaimer, the term of this patent is extended or adjusted under 35 U.S.C. 154(b) by 1368 days.

(21) Appl. No.: 10/081,411

(22) Filed: Feb. 20, 2002

(51) Int. Cl.
G06Q 30/00 (2006.01)
G06Q 40/00 (2006.01)

(52) U.S. Cl. ......................................... 705/26.4; 705/37

(58) Field of Classification Search .................. None
See application file for complete search history.

(56) References Cited

U.S. PATENT DOCUMENTS

| | | | | |
|---|---|---|---|---|
| 5,224,034 A * | 6/1993 | Katz et al. | | 705/7 |
| 5,615,109 A * | 3/1997 | Eder | | 705/8 |
| 5,890,138 A | 3/1999 | Godin et al. | | 705/26 |
| 6,012,045 A | 1/2000 | Barzilai et al. | | 705/37 |
| 6,058,379 A | 5/2000 | Odom et al. | | 705/37 |
| 6,260,024 B1 * | 7/2001 | Shkedy | | 705/37 |
| 6,285,989 B1 | 9/2001 | Shoham | | 705/37 |
| 6,366,891 B1 | 4/2002 | Feinberg | | 705/37 |
| 6,415,270 B1 | 7/2002 | Rackson et al. | | 705/37 |
| 6,449,601 B1 | 9/2002 | Friedland et al. | | 705/37 |
| 6,584,451 B1 | 6/2003 | Shoham et al. | | 705/26 |
| 6,598,026 B1 | 7/2003 | Ojha et al. | | |
| 6,606,603 B1 | 8/2003 | Joseph et al. | | 705/26 |
| 6,631,356 B1 * | 10/2003 | Van Horn et al. | | 705/26 |
| 6,647,373 B1 * | 11/2003 | Carlton-Foss | | 705/37 |
| 6,751,597 B1 * | 6/2004 | Brodsky et al. | | 705/37 |
| 6,871,191 B1 | 3/2005 | Kinney et al. | | 705/37 |
| 7,010,511 B1 * | 3/2006 | Kinney et al. | | 705/37 |
| 7,110,976 B2 * | 9/2006 | Heimermann et al. | | 705/37 |
| 7,243,077 B2 * | 7/2007 | Broden et al. | | 705/80 |
| 7,364,086 B2 * | 4/2008 | Mesaros | | 235/492 |
| 7,386,476 B1 * | 6/2008 | Shavanadan et al. | | 705/26.2 |
| 7,480,621 B1 * | 1/2009 | Megiddo | | 705/301 |
| 2001/0032170 A1 | 10/2001 | Sheth | | 705/37 |
| 2001/0039528 A1 | 11/2001 | Atkinson et al. | | |
| 2001/0049634 A1 * | 12/2001 | Stewart | | 705/26 |
| 2002/0026429 A1 * | 2/2002 | Lostis et al. | | 705/80 |
| 2002/0065764 A1 | 5/2002 | Brodersen et al. | | |
| 2002/0103746 A1 * | 8/2002 | Moffett, Jr. | | 705/37 |
| 2002/0111897 A1 | 8/2002 | Davis | | |

(Continued)

FOREIGN PATENT DOCUMENTS

EP    1111529    6/2001

(Continued)

OTHER PUBLICATIONS

Deshpande, Kalyan K. Office Action for U.S. Appl. No. 09/999,670, mailed Nov. 22, 2005, pp. 1-23.

(Continued)

*Primary Examiner* — Mussa Shaawat
(74) *Attorney, Agent, or Firm* — Goodwin Procter LLP

(57) ABSTRACT

A computer-implemented method for satisfying a purchase requisition includes receiving, from each of a plurality of candidate suppliers, a corresponding plurality of bids. At least one candidate supplier includes, with its bids, an offer of a business-volume discount that is triggered when an aggregate purchase of at least one unit of a first item and at least one unit of a second item is within a defined volume interval. An optimal award schedule for satisfaction of the purchase requisition is then determined.

20 Claims, 39 Drawing Sheets

U.S. PATENT DOCUMENTS

| | | | |
|---|---|---|---|
| 2002/0143692 A1 | 10/2002 | Heimermann et al. | 705/37 |
| 2002/0147674 A1 | 10/2002 | Gillman | |
| 2002/0165813 A1 | 11/2002 | Lee | |
| 2002/0165814 A1 | 11/2002 | Lee et al. | |
| 2003/0004784 A1* | 1/2003 | Li et al. | 705/10 |
| 2003/0004850 A1* | 1/2003 | Li et al. | 705/37 |
| 2003/0028473 A1* | 2/2003 | Eso et al. | 705/37 |
| 2003/0028475 A1 | 2/2003 | Boutilier et al. | 705/37 |
| 2003/0033236 A1* | 2/2003 | Davenport et al. | 705/37 |
| 2003/0041014 A1* | 2/2003 | Grey et al. | 705/37 |
| 2003/0088494 A1* | 5/2003 | Lee | 705/37 |
| 2003/0195835 A1 | 10/2003 | Sandholm et al. | 705/37 |
| 2004/0010461 A1 | 1/2004 | Boutilier | 705/37 |
| 2004/0039680 A1 | 2/2004 | Horch et al. | |
| 2004/0059664 A1 | 3/2004 | Suri et al. | 705/37 |
| 2004/0059665 A1 | 3/2004 | Suri et al. | 705/37 |
| 2004/0262381 A1* | 12/2004 | Mesaros | 235/380 |
| 2005/0044032 A1 | 2/2005 | Lee et al. | |
| 2005/0119900 A1* | 6/2005 | Eder | 705/1 |

FOREIGN PATENT DOCUMENTS

| | | |
|---|---|---|
| WO | WO-03034187 | 4/2003 |

OTHER PUBLICATIONS

Segev, Arie; Beam, Carrie; Shanthikumar, J. George; "Optimal Design of Internet-Based Auctions", Information Technology and Management, Apr. 2001, pp. 121-163.

Emiliani, M.L.; "Business-to-Business Online Auctions: Key Issues for Purchasing Process Improvement", Supply Chain Management, 2000, p. 176.

Ba, Sulin; Stallaert, Jan; Whinston, Andrew; "Optimal Investment in Knowledge Within a Firm Using a Market Mechanism", Management Science, Sep. 2001, pp. 1203-1219.

Yannis, Bakos; "The Emerging Role of Electronic Marketplaces on the Internet", Association for Computing Machinery, Aug. 1998, pp. 35-42.

Anon., "Northern Seeks Lowest Bid in Reverse Auction," Gas Daily, vol. 10, No. 93, May 14, 1993.

Bornhovd et al. "An Infrastructure for Meta-Auctions" IEEE, Jun. 8-9, 2000, pp. 1-10.

Examiner's Answer to Appeal Brief in related U.S. Appl. No. 09/664,226, mailed Jul. 10, 2007, 19 pages.

Examiner's Answer to Appeal Brief in related U.S. Appl. No. 09/664,226, mailed Mar. 21, 2007, 21 pages.

Examiner's Answer to Appeal Brief in related U.S. Appl. No. 09/664,226, mailed Sep. 19, 2006, 17 pages.

Office Action in related U.S. Appl. No. 10/831,969, mailed Feb. 14, 2008, 11 pages.

Notice of Allowance issued in related U.S. Appl. No. 10/831,969, mailed Jul. 23, 2008, 10 pages.

"B2eMarkets Wins GSA Reverse Auction Contract; Government-Wide Acquisition Contract for Software and Services" PR Newswire, pDCTH00215082002, Aug. 15, 2002, Retrieved from Dialog, 03249874, 2 pages.

Colbert, Ella. Office Action for U.S. Appl. No. 09/664,226, mailed Sep. 12, 2005, pp. 1-16.

Colbert, Ella. Office Action for U.S. Appl. No. 09/664,226, mailed Jan. 11, 2005, pp. 1-23.

Colbert, Ella. Office Action for U.S. Appl. No. 09/664,226, mailed Jul. 7, 2004, pp. 1-25.

Akers, Geoffrey R. Office Action for U.S. Appl. No. 09/664,226, mailed Sep. 26, 2003, pp. 1-7.

Jérémie Gallien, "Optimization-Based Auctions and Stochastic Assembly Replenishment Policies For Industrial Procurement", PhD Thesis in Operations Research, Massachusetts Institute of Technology, Jun. 2000.

* cited by examiner

Home >Bid Center >Auction Supplies2> Requisition: Req 1 >Item: Pencils

Auction Info

| Auction Name | Supplies2 |
| Auction Status | Open |
| Auction Type | Dutch |
| Show All Bidders | No |
| Start Date | 05/11/2000 15:48 |
| End Date | 07/11/2000 16:00 |

Item Details

| Product Category | sshcat1 |
| Name | Pencils |
| Code | PEN101 |
| Description | # 2 Pencils |
| Minimum Desired Quantity | 1,000 |
| Maximum Desired Quantity | |
| Price Quote Unit | |
| Lot Size | |
| Required Delivery Date | |

| Reserved Price | |
| Historical Price | |
| Minimum Bid Quantity | 0 |
| Maximum Bid Quantity | |

Lowest Bid

| Bidder | 7 |
| Max Bid Quantity | 1,000 |
| Price Per Unit | $0.05 |
| Highest Bid Allowed | $0.04 |

View Bids

The following are the current bids for this item.

| ITEM | QTY DESIRED | BID 1 ABC CO. | | BID 2 BESTDEAL | | BID 3 SURFIN |
|---|---|---|---|---|---|---|
| 2x4x8 | 400 | 400 | 1.25 | 400 | 1.25 | 400 |
| 2x12x10 | 1000 | 1000 | 5.00 | 1000 | 4.50 | 1000 |
| PW 4x8x1/2 | 100 | 100 | 25.00 | 100 | 25.00 | 100 |
| | | | | | | BUNDLED @ $7350 |

FIG. 18

FIG. 19 ePass - Microsoft Internet Explorer

File  Edit  View  Favorites  Tools  Help

Back  Forward  Stop  Refresh  Home  Search  Favorites  History  Mail  Print  Edit  Discuss  Dell Home Address http://qa03/en/index.html   Go  Link » electronic procurement
application for
strategic sourcing ePass

Supplier Home
Message Center
View Bids
Logout

Help

Home > Bid Center > Auction: Construction > Requisition Items: REQ1

Auction Info

| Auction Name | Construction |
| Auction Status | Open |
| Auction Type | Sealed |
| Show All Bidders | No |
| Start Date | 05/11/2000 14:31 |
| End Date | 07/11/2000 14:30 |

View Requisition Items

The following line items are in the requisition.

1-3 of 3

| Level | Selection | Item | Type | Category | Description | Desired Qty | Price | Action |
|---|---|---|---|---|---|---|---|---|
| | ☑ | 2x4x8 | Single Item | sshcat1 | Lumber 2 x 4 x 8 ft | 400 | | Bid Messages |
| | ☑ | 2x12x10 | Single Item | sshcat1 | Lumber 2 x 12 x 10 ft | 1,000 | | Bid Messages |
| | ☑ | PW 4x8x1/2 | Single Item | sshcat1 | Plywood 4 x 8 x 1/2 in | 100 | | Bid Messages |

Select All | Unselect All | Switch All

Create Bundled Bid

Local intranet

$$\left(\begin{array}{c}\text{PRICE}\\\text{TERM}\end{array}\right) + \left(\begin{array}{c}\text{NON-PRICE}\\\text{TERM}\end{array}\right) - \left(\begin{array}{c}\text{BVD}\\\text{TERM}\end{array}\right)$$

$$\text{PRICE TERM} = \sum_{s \in S} \left[ \sum_{b(s) \in B(s)} \left[ f_i^{b(s)} X^{b(s)} + C_i^{b(s)} x_i^{b(s)} \right] + \sum_{d(s) \in D(s)} f^{d(s)} \sum_{i \in d(s)} Z^{d(s)} + C_i^{d(s)} Z_i^{d(s)} \right] + \sum_{d(s) \in D(s)} \left[ \sum_{b(s) \in B(s)} C_i^{b(s)} x_i^{b(s)} + \sum_{d(s) \in D(s)} C_i^{d(s)} Z_i^{d(s)} \right]$$

$$\text{NON-PRICE TERM} = \sum_{k \in K} \sum_{i \in I} w_{k,i} \left\{ \sum_{s \in S} \left( \frac{100 - r_{k,i}^s}{100} \right) \right\}$$

$$\text{BVD TERM} = \sum_{s \in S} \sum_{bvd \in BVD(s)} \sum_{h \in seg(bvd)} D_{s,bvd}^h I_{s,bvd}^h$$

FIG. 30

$$\sum_{s \in S} \left( \sum_{b(s) \in B(s)} x_i^{b(s)} + \sum_{d(s) \in D(s)} z_i^{d(s)} \right) \leq Q_i^u \qquad \forall i \in I \qquad (1)$$

$$\sum_{s \in S} \left( \sum_{b(s) \in B(s)} x_i^{b(s)} + \sum_{d(s) \in D(s)} z_i^{d(s)} \right) \geq Q_i^l \qquad \forall i \in I \qquad (2)$$

$$\sum_{i \in g} \left( \sum_{b(s) \in B(s)} x_i^{b(s)} + \sum_{d(s) \in D(s)} z_i^{d(s)} \right) - Y_g^s M_g \leq 0 \qquad \begin{array}{l} \forall s \in S \\ \forall g \in G \end{array} \qquad (3)$$

$$\sum_{i \in g} \left( \sum_{b(s) \in B(s)} x_i^{b(s)} + \sum_{d(s) \in D(s)} z_i^{d(s)} \right) - Y_g^s \geq 0 \qquad \begin{array}{l} \forall s \in S \\ \forall g \in G \end{array} \qquad (4)$$

$$\sum_{s \in T} Y_g^s \leq \text{Max } N_g^t \qquad \forall g \in G, \; \forall t \in T \qquad (5)$$

$$\sum_{s \in T} Y_g^s \geq \text{Min } N_g^t \qquad \forall g \in G, \; \forall t \in T \qquad (6)$$

FIG. 32

$$\sum_{s \in t} \sum_{i \in g} \left( \sum_{b(s) \in B(s)} x_i^{b(s)} + \sum_{d(s) \in D(s)} z_i^{d(s)} \right) \le \text{Max } Q_g^t, \forall g \in G, \forall t \in T \quad (7)$$

$$\sum_{s \in t} \sum_{i \in g} \left( \sum_{b(s) \in B(s)} x_i^{b(s)} + \sum_{d(s) \in D(s)} z_i^{d(s)} \right) \ge \text{Min } Q_g^t, \forall g \in G, \forall t \in T \quad (8)$$

$$\sum_{s \in t} \sum_{i \in g} \left( \sum_{b(s) \in B(s)} c_i^{b(s)} x_i^{b(s)} + \sum_{d(s) \in D(s)} c_i^{d(s)} z_i^{d(s)} \right) \le \text{Max } V_g^t, \forall g \in G, \forall t \in T \quad (9)$$

$$\sum_{s \in t} \sum_{i \in g} \left( \sum_{b(s) \in B(s)} c_i^{b(s)} x_i^{b(s)} + \sum_{d(s) \in D(s)} c_i^{d(s)} z_i^{d(s)} \right) \ge \text{Min } V_g^t, \forall g \in G, \forall t \in T \quad (10)$$

FIG. 33

$$(11) \quad Z_i^{d(s)} - u_i^{d(s)} Z^{d(s)} \leq 0 \qquad \forall i \in I, \forall s \in S, \forall b(s) \in B(s)$$

$$(12) \quad Z_i^{d(s)} - l_i^{d(s)} Z^{d(s)} \geq 0 \qquad \forall i \in I, \forall s \in S, \forall b(s) \in B(s)$$

$$(13) \quad X_i^{b(s)} - X^{b(s)} U_i^{b(s)} \leq 0 \qquad \forall s \in S, \forall b(s) \in B(s)$$

$$(14) \quad X_i^{b(s)} - X^{b(s)} L_i^{b(s)} \geq 0 \qquad \forall s \in S, \forall b(s) \in B(s)$$

$$(15) \quad 0 \leq X_i^{b(s)} \leq U_i^{b(s)} \qquad \forall s \in S, \forall b(s) \in B(s)$$

$$(16) \quad 0 \leq Z_i^{d(s)} \qquad \forall d(s) \in D(s)$$

$$(17) \quad X^{b(s)} = \begin{cases} 0 \\ 1 \end{cases} \qquad \forall b(s) \in B(s)$$

$$(18) \quad Y_g^s = \begin{cases} 0 \\ 1 \end{cases} \qquad \forall g \in G, \forall s \in S$$

$$(19) \quad Z_g^s = \begin{cases} 0 \\ 1 \end{cases} \qquad \forall g \in G, \forall s \in S$$

FIG. 34

$$(20) \quad H^U_{s,bvd}(h) \cdot I^h_{s,bvd} \geq \left[ \sum_{\substack{b(s) \in B(s) \\ i \in categories(bvd)}} f_i^{h(s)} \cdot X_{bvd}^{h(s)} + c_i^{h(s)} \cdot x_{i,bvd}^{h(s)} + \sum_{d(s) \in D(s)} \sum_{\substack{i \in d(s) \\ i \in categories(bvd)}} f_i^{d(s)} \cdot Z_{i,bvd}^{d(s)} + c_i^{d(s)} \cdot z_{i,bvd}^{d(s)} \right] \geq H^L_{s,bvd}(h) \cdot I^h_{s,bvd}$$

$$(21) \quad \sum_{h \in segments(bvd)} I^h_{s,bvd} = 1 \quad \forall s \in S \text{ and } bvd \in BVD(s)$$

$$(22) \quad \sum_{bvd \in COVEREDBVD(b(s))} J^{b(s)}_{bvd} = 1 \quad \forall s \in S \text{ and } b(s) \in B(s)$$

$$(23) \quad \sum_{bvd \in COVEREDBVD(d(s),i)} J^{d(s)}_{i,bvd} = 1 \quad \forall s \in S, \quad d(s) \in D(s) \text{ and } i \in d(s)$$

FIG. 35

$$(24) \quad -M \cdot J_{bvd}^{b(s)} \leq X_{bvd}^{b(s)} \leq J_{bvd}^{b(s)} \cdot M$$
$$X^{b(s)} - M \cdot (1 - J_{bvd}^{b(s)}) \leq X_{bvd}^{b(s)} \leq (1 - J_{bvd}^{b(s)}) \cdot M + X^{b(s)}$$

$$(25) \quad -M \cdot J_{bvd}^{b(s)} \leq x_{i,bvd}^{b(s)} \leq J_{bvd}^{b(s)} \cdot M$$
$$x_i^{b(s)} - M \cdot (1 - J_{bvd}^{b(s)}) \leq x_{i,bvd}^{b(s)} \leq (1 - J_{bvd}^{b(s)}) \cdot M + x_i^{b(s)}$$

$$(26) \quad -M \cdot J_{i,bvd}^{d(s)} \leq Z_{i,bvd}^{d(s)} \leq J_{i,bvd}^{d(s)} \cdot M$$
$$Z_i^{d(s)} - M \cdot (1 - J_{i,bvd}^{d(s)}) \leq Z_{i,bvd}^{d(s)} \leq (1 - J_{i,bvd}^{d(s)}) \cdot M + Z_i^{d(s)}$$

$$(27) \quad -M \cdot J_{i,bvd}^{d(s)} \leq z_{i,bvd}^{d(s)} \leq J_{i,bvd}^{d(s)} \cdot M$$
$$z_i^{d(s)} - M \cdot (1 - J_{i,bvd}^{d(s)}) \leq z_{i,bvd}^{d(s)} \leq (1 - J_{i,bvd}^{d(s)}) \cdot M + z_i^{d(s)}$$

$$(28) \quad I_{s,bvd}^{h} \in \{0,1\} \quad s \in S, \quad bvd \in BVD(s), \quad h \in segments(bvd)$$

$$(29) \quad J_{bvd}^{b(s)} \in \{0,1\} \quad s \in S, \quad b(s) \in B(s), \quad bvd \in coveredbids(b(s))$$

$$(30) \quad J_{bvd}^{d(s)} \in \{0,1\} \quad s \in S, \quad d(s) \in D(s), \quad bvd \in coveredbids(d(s)',i)$$

*FIG. 36*

AUCTION MANAGEMENT WITH BUSINESS-VOLUME DISCOUNT

TECHNICAL FIELD

This invention relates to the field of strategic sourcing, and in particular, to the management of an on-line auction.

BACKGROUND

To achieve and maintain prosperity, a business is frequently called upon to make decisions concerning where to acquire various goods and services. In the context of manufacturing, raw materials that are to be processed or assembled to manufacture a product must be replaced if additional products are to be manufactured. Similarly, a service business often consumes supplies in the process of delivering services to its customers. These supplies must likewise be replaced if the services are to continue.

Supplies can be tangible goods, for example iron and coke used to make steel, or they can be intangible services, for example collection services for collecting delinquent payments. Throughout this specification, the term "item" is used to refer to both goods and services.

In a conventional method for acquiring items, a buyer opens a reverse auction, hereafter referred to as an auction, by distributing a "request-for-quotation," or RFQ, to prospective suppliers. The RFQ contains a list of what items the buyer would like to purchase. In some cases, the RFQ contains additional information pertinent to the proposed transaction, such as minimum or maximum quantities, delivery dates or standards of quality. The RFQ can thus be viewed as a collection of constraints imposed by the buyer on a proposed transaction.

In response to the RFQ, the prospective suppliers submit bids, which are essentially offers to enter into a contract with the buyer. These bids typically include offer prices together with additional proposed terms. The response can thus be viewed as a collection of constraints imposed by the supplier on the proposed transaction.

To the extent that the constraints imposed by the buyer and the constraints imposed by a particular supplier are both met, a transaction between the buyer and the particular supplier is feasible. In a typical auction, there will be numerous suppliers for which this is the case. The buyer must then choose which of those suppliers are to be awarded the bid. The optimal combination of suppliers, together with the list of items to be ordered from each supplier, is referred to as an optimal award schedule.

Where price is the buyer's sole concern, and all bids can yield a unit price-per-item, the process of determining an optimal award schedule is decidedly trivial. One simply selects the supplier offering the lowest price-per-item. If the buyer requires additional quantities of that item once that supplier's supply of the item is exhausted, the buyer then selects the supplier having the next lowest price-per-item. This process continues until the buyer's constraint on the quantity of the item has been met.

In reality, however, modern business-to-business transactions are far from being so simple. For example, a supplier's price for an item can be made to depend on the quantity of that item purchased. Or, the supplier may give one price for a bundle of disparate items, in which case it is unclear how to allocate this price among the items.

In addition, other less clearly quantifiable factors must often be considered. For example, the quality of goods or the reputation of the supplier for reliability, or the supplier's solvency, may need to be considered. The buyer may also have internally generated policies, or business rules, that further constrain which the choice of which suppliers can be awarded a bid.

In addition, the relative importance of the various factors can vary depending on the context in which the decision is made. For example, anyone who has been a passenger on a commercial airline might reasonably infer that it is more important for meals be delivered to the aircraft prior to the scheduled departure time than it is that the meals stimulate the palate. Similarly, in purchasing latex gloves for a fast food restaurant, a slight porosity of the glove may not be as important as a low price. In contrast, when purchasing latex gloves for an operating room, the price savings may be irrelevant given the far more serious consequences of contamination.

The complexity of compiling a quantitatively justifiable schedule of optimal awards given all the foregoing constraints is daunting even when the choice is limited to a few suppliers bidding on a limited number of items. As a result, decision-makers often rely on what is euphemistically termed "heuristic reasoning" when awarding bids to suppliers. That decisions of such importance are based on what amounts to educated guesswork is alarming, particularly in an era in which computational tools are so widely available.

SUMMARY

The complexities associated with selecting suppliers to optimally satisfy, or at least partially satisfy, a purchase requisition are addressed by a computer-implemented method for determining an optimal award schedule that satisfies that requisition.

Requisitions can include a purchase of one or more items, the performance of one or more services, or any combination thereof. As used herein, satisfaction of a requisition encompasses both partial and complete satisfaction of the requisition.

In the computer-implemented method, a plurality of bids is received from each of a plurality of candidate suppliers. Each bid includes a list of items that a supplier is offering to sell and a list of conditions attached to the sale of those items. In addition, there is received, from at least one candidate supplier, an offer of at least one business volume discount. The business-volume discount is triggered when an aggregate purchase of at least one unit of a first qualifying item and one unit of a second qualifying item is within a defined volume interval. The discount can be an amount that is subtracted from the cost of the bid or a percentage by which the total cost of the bid is reduced.

The set of all qualifying items is referred to herein as a discount set associated with that business-volume discount. A business-volume discount is triggered only when the total award across all qualifying items in the discount set associated with that business-volume discount exceeds the volume threshold associated with that business-volume discount. For example, a business-volume discount can be triggered when the aggregate purchase that includes at least one unit of a first item and one unit of a second item exceeds the volume threshold for that business-volume discount. In this respect, a business-volume discount is different from an item-volume discount, which is triggered when a buyer purchases enough units of a single item to reach a volume threshold associated with that item-volume discount for that item.

Following receipt of the plurality of bids, the method determines an optimal award schedule for satisfaction of the purchase requisition.

As used herein, "item" refers to both the purchase or lease of goods, whether personalty and realty, and the performance of services. Items can themselves be formed from collections of other items. Each item can belong to a class, or category of items hereafter referred to as an item-category. In some embodiments, each item belongs to at most one item-category. In other embodiments, an item can belong to several item-categories at the same time. A discount set can be specified by listing qualifying items, by listing item-categories that consist of qualifying items, or by any combination thereof.

In some practices of the invention, receiving an offer of a business-volume includes receiving a an offer of a business-volume discount that covers the purchases of items belonging to a limited subset of the available categories of items. An example of such a business-volume discount is one that is triggered on the basis of purchases of items belonging to a first item-category but is not triggered by purchases of items belonging to a second item-category.

In other practices of the invention, in which the discount set is specified at least in part by listing item-categories that consist of qualifying items, each qualifying item belongs to no more than one item-category. In such a case, the purchase of a unit of a qualifying item can only contribute toward meeting the volume threshold of one business volume discount, namely that business-volume discount that includes that qualifying item in its discount set.

In other practices of the invention, in which the discount set is specified at least in part by listing item-categories that consist of qualifying items, a qualifying item potentially belongs to more than one item-category. In such cases, the purchase of a unit of a qualifying item can contribute to reaching a volume threshold of any business-volume discount that includes that qualifying item in its discount set. When this is the case, it is sometimes desirable to constrain the optimal award schedule to allow the purchase of a unit of a qualifying item to contribute toward reaching no more than one volume threshold.

A business-volume discount can also include several volume intervals. The value of the business-volume discount in such cases depends not on whether the business volume exceeds a volume threshold but instead depends on which volume interval the business volume falls within.

Unless otherwise defined, all technical and scientific terms used herein have the same meaning as commonly understood by one of ordinary skill in the art to which this invention belongs.

Although methods or systems similar or equivalent to those described herein can be used in the practice or testing of the present invention, suitable methods and systems are described below. In addition, the systems, methods, and examples are illustrative only and not intended to be limiting.

Other features and advantages of the invention will be apparent from the following detailed description, and from the claims. The details of one or more embodiments of the invention are set forth in the accompanying drawings and the description below. Other features, objects, and advantages of the invention will be apparent from the description and drawings, and from the claims.

DESCRIPTION OF FIGURES

FIG. 6 shows the registration form for enrolling as a participant in an auction managed by the auction management software of FIG. 1;

FIG. 10 is part of a series of web pages encountered by a buyer in the process of defining an auction;

FIG. 11 is a web page used by the buyer to control the temporal extent of an auction;

FIG. 12 is a web page used by a supplier to identify those auctions at which it is qualified to bid;

FIG. 14 is a web page used by a supplier to submit a bid;

FIGS. 15A and 15B together show a web page from which a supplier learns about the public buyer-constraints associated with a particular requisition;

FIGS. 16A and 16B together show a web page visible to a buyer and showing a bid with an item-volume discount;

FIG. 17 is a web page used by a supplier to submit a bid with an item-volume discount;

FIG. 18 is a table comparing one bundled bid and two conventional bids;

FIG. 19 is a web page inviting a supplier to submit a bundled bid;

FIGS. 20A and 20B together show a web page soliciting details of a bundled bid from a supplier;

FIG. 27 is a web page for defining maximum and minimum award values to be associated with a business rule;

FIG. 28 is a web page inviting the buyer to express relative preferences for different performance factors;

FIG. 30 is the objective function evaluated by the optimization engine of FIG. 4;

FIGS. 32-36 show the constraints applied in optimizing the objective function of FIG. 30.

DETAILED DESCRIPTION

Figure 1:
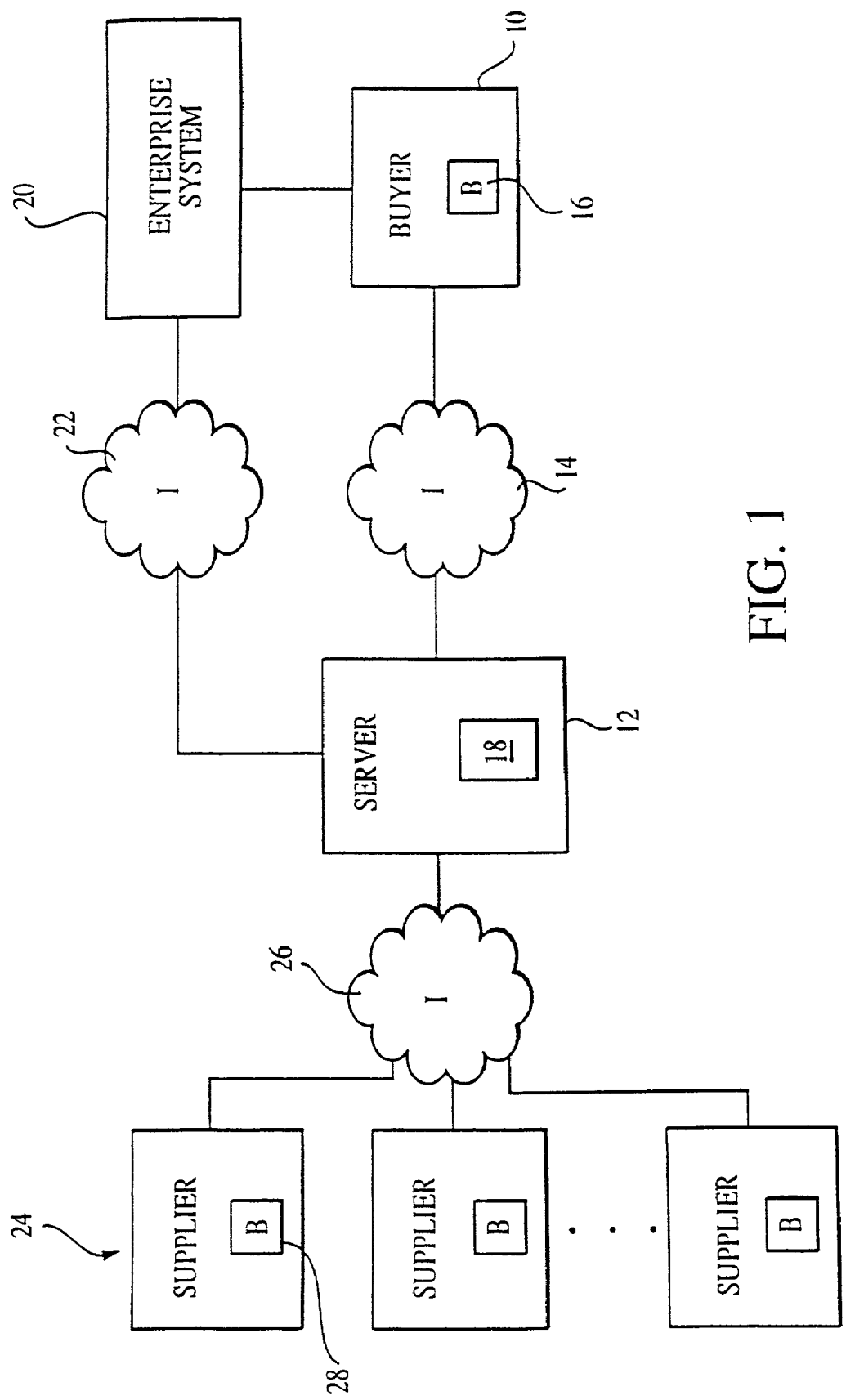
FIG. 1 shows a configuration of computer systems served by the auction management software of the invention.

FIG. 1 shows a buyer machine 10 in data communication with a server 12 across an internet link 14. The buyer machine 10 is equipped with a browser 16 for communicating with auction management software 18 executing on the server 12.

An enterprise system 20 associated with the buyer is also in communication with the buyer machine 10 to supply data required by the buyer machine 10 in generating an RFQ for transmission to the server 12. Optionally, the enterprise system 20 is connected to the server 12 over an internet link 22 to make data available to the auction management software 18 during the processing steps associated with determining an optimal award schedule.

FIG. 1 also shows a plurality of supplier machines 24, all of which are in data communication with the server 12 across an internet link 26. The supplier machines are all equipped with browsers 28 for communication with the auction management software 18 on the server 12.

Figure 2:
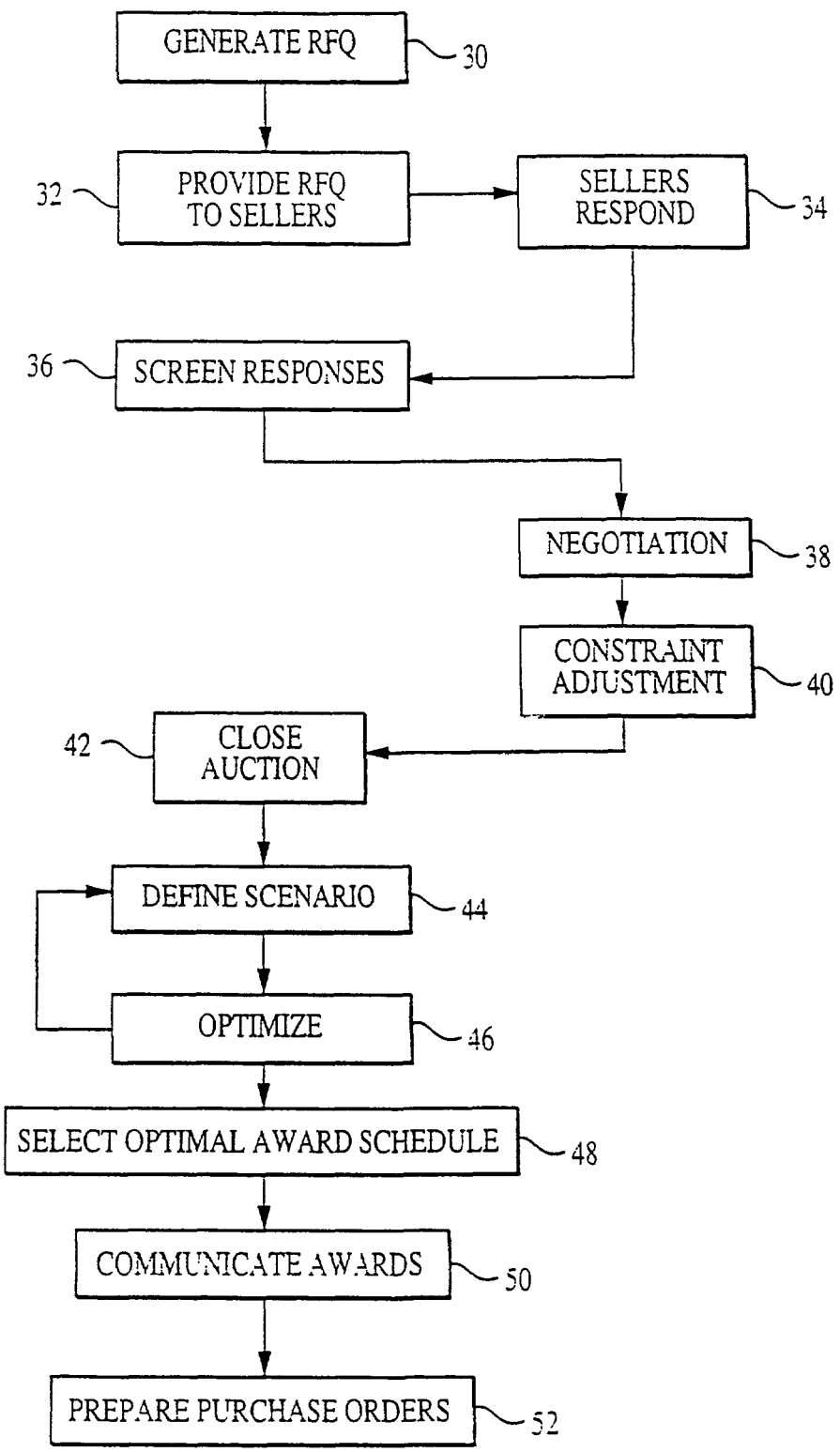
FIG. 2 is a flowchart that includes steps performed by the auction management software of FIG. 1.

The auction process begins, as shown in FIG. 2, with the buyer providing an RFQ to the server 12 (step 30). The RFQ includes a detailed specification of what the buyer intends to purchase, together with whatever other transaction terms would be required by the buyer in a prospective transaction with a supplier. The data in the RFQ thus defines a set of buyer constraints that are provided to the auction management software 18, and ultimately, to the suppliers. These buyer constraints include those that must be made known to the suppliers in order for the suppliers to formulate a bid. Because they are published to the suppliers, these buyer constraints are public buyer constraints.

The buyer also provides auction management software 18 with procedural data relating to the management of the auction. Such procedural data includes times for opening and closing the auction as well as criteria for selecting those suppliers that will be invited to bid.

The auction management software 18 executing at the server 12 opens the auction by publishing the details of the RFQ to selected suppliers at the time specified by the buyer (step 32). During the course of an auction interval specified by the buyer, one or more suppliers respond to the RFQ by submitting bids (step 34). These bids represent constraints imposed by the supplier on a proposed transaction between the supplier and the buyer. The auction management software screens these bids to discard those presenting supplier constraints that are inconsistent with the constraints specified by the buyer (step 36). The remaining bids are then forwarded to the buyer.

Having received responses from the suppliers, the buyer now has an opportunity to negotiate with individual suppliers (step 38). The auction management software facilitates such negotiations by providing a messaging function for communicating directly with those persons that have the authority to enter into such negotiation. Any adjustments to either the public buyer constraints or the supplier constraints are then provided to the auction management software 18 (step 40).

After a selected interval, the auction management software 18 closes the auction (step 42).

The public buyer constraints that were published to the suppliers are not necessarily the only buyer constraints. An additional set of private buyer constraints can subsequently be imposed by the buyer. These private buyer constraints are those that need not be provided to the suppliers in order to enable the suppliers to bid. The fact that these constraints are never provided to the suppliers means that the buyer can choose whether or not to impose them in determining the optimal award schedule. The selection of which private buyer constraints to apply is referred to as defining a "scenario" (step 44).

A private buyer constraint can arise, for example, when there exists a pre-existing contract with a supplier that requires the buyer to award that supplier a predetermined amount of business. The existence of this pre-existing contract limits the buyer's choice of supplier. However, it is clearly not necessary to disclose the existence of such a contract to all suppliers. Such a constraint is an example of a "business rule."

Another example of a private buyer constraint is a set of buyer preferences. For example, a particular supplier may have a reputation for unreliability. Another supplier may be in a state of near insolvency. The buyer may wish to weigh such factors in awarding bids. However, the extent to which the buyer weights these factors need not be disclosed to the suppliers.

Once the buyer has defined a scenario by imposing (or alternatively, choosing not to impose) the private buyer constraints, the auction management software begins the optimization process (step 46). The optimization process optimizes an objective function subject to the buyer constraints. The result of the optimization process is a schedule of optimal awards. In addition, the optimization process provides information indicative of why particular awards were made and why bids made by other suppliers were rejected.

Following the optimization process, the buyer can define another scenario (step 44) by changing the private buyer constraints and determine the optimal award schedule for that scenario (step 48). Once the buyer has collected one or more optimal award schedules, corresponding to one or more scenarios, he can select an optimal award schedule (step 48) and instruct the auction management software to communicate the selected awards to the appropriate suppliers (step 50) and to prepare purchase orders as required.

System Architecture

Figure 3:
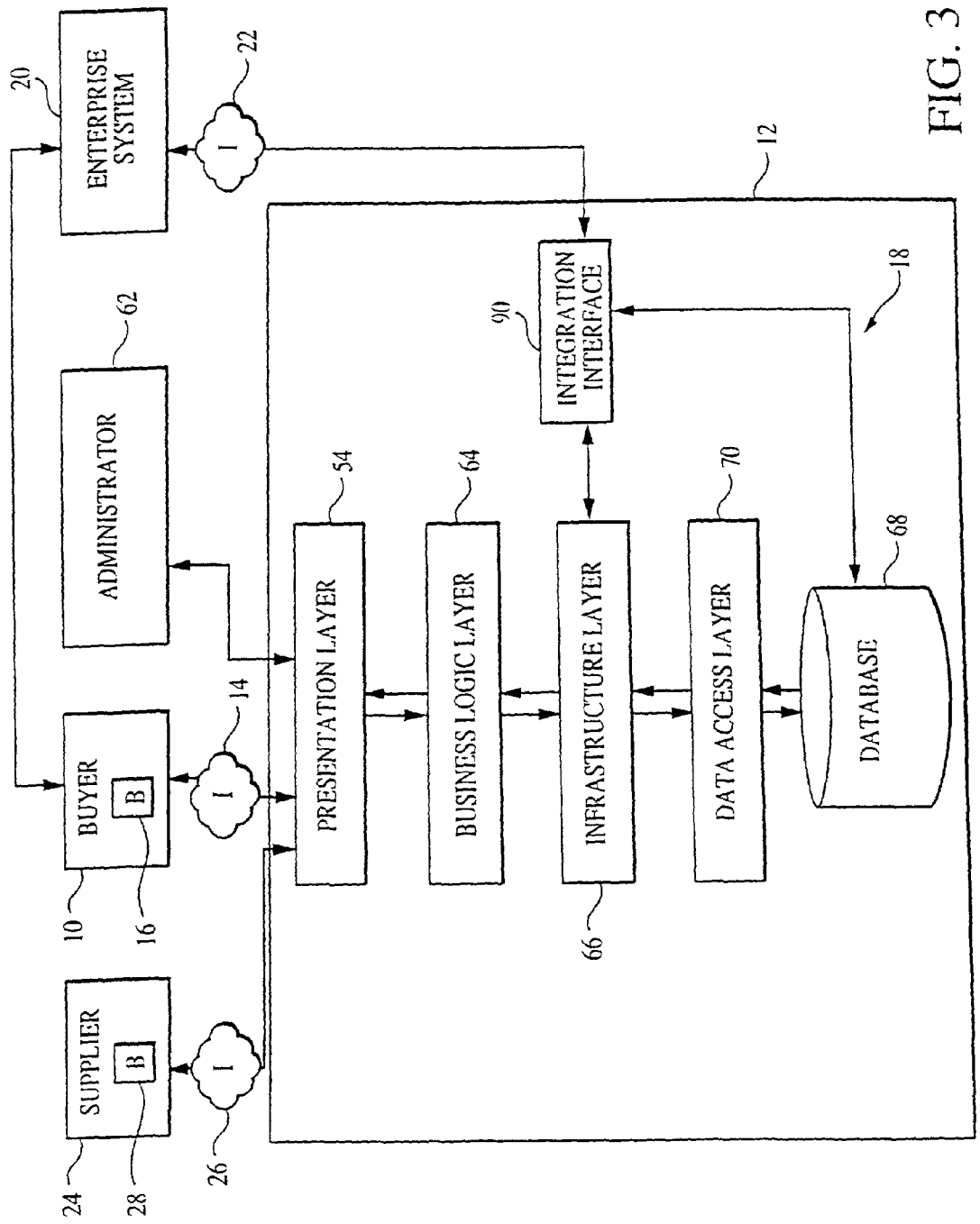
FIG. 3 shows the architecture of the auction management software of FIG. 1.
Figure 4:
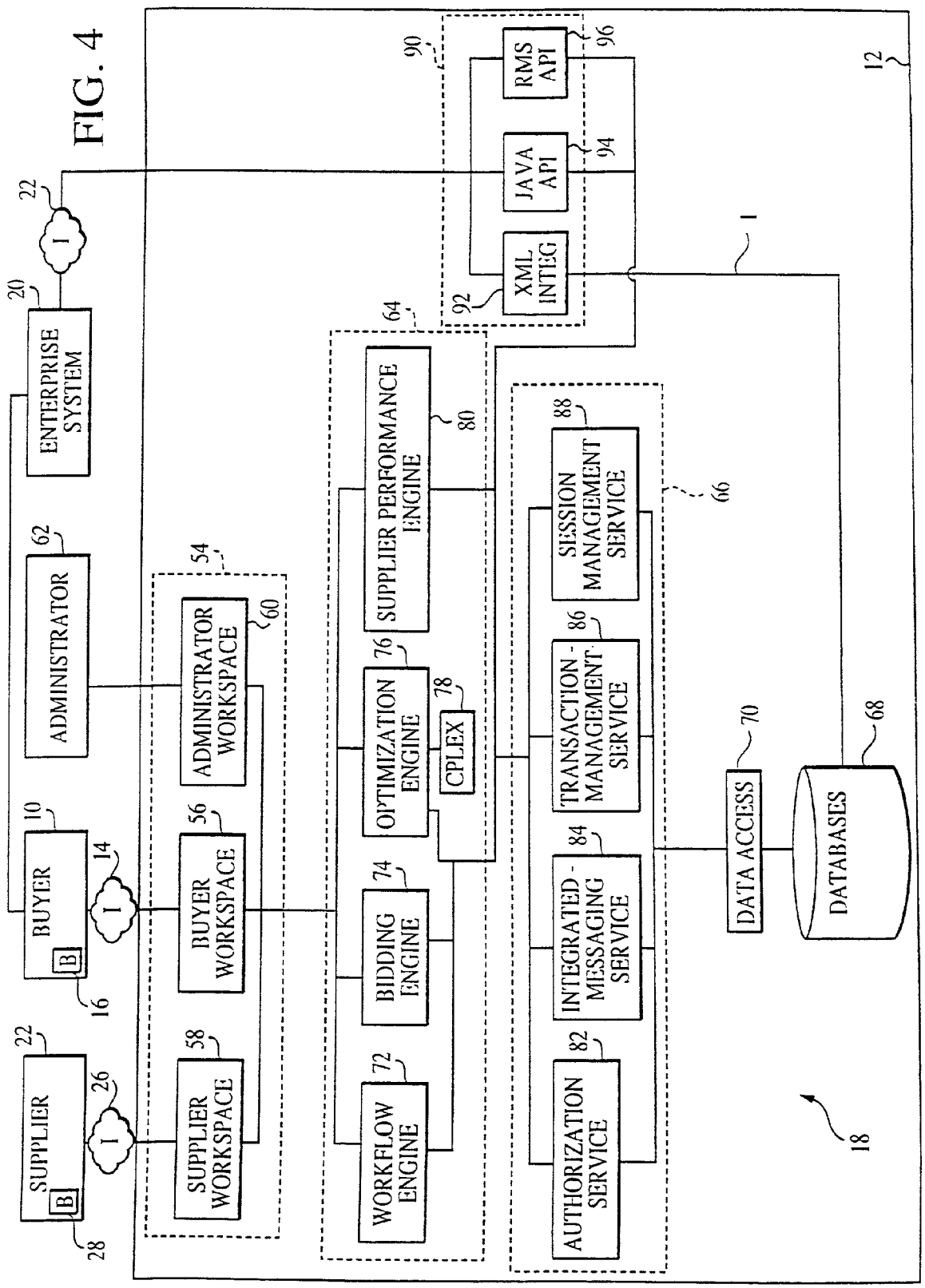
FIG. 4 is a more detailed diagram of the architecture shown in FIG. 3.

The auction management software 18 is implemented as a multi-layer system executing on the server, as shown in FIGS. 3 and 4. The layer with which the buyer machine and the supplier machine interact is a presentation layer 54 that dynamically generates web pages and presents them to the supplier machine 24 or the buyer machine 10. It is through these web pages that the buyer and supplier interact with the auction management software 18.

Because of their demonstrated cross-platform compatibility, security, networking, and multi-thread support, the auction management software 18 delivers Java components embedded in dynamically generated web pages. In particular, Enterprise Java Beans ("EJB") provides a readily scalable solution for seamlessly integrating diverse application components in a distributed computing environment. Another benefit of employing EJB is that it enables the auction management software 18 to freely communicate with other systems using a well-defined protocol such as RMI, or CORBA.

Referring to FIG. 4, for each auction, the presentation layer 54 includes a buyer workspace 56 and a plurality of supplier workspaces 58. These workspaces are accessed by web browsers 16,28 that execute on buyer and supplier machines 10, 24 remote from the server. The buyer workspace enables a corporate purchase manager to conduct on on-line auction and to analyze bids submitted by suppliers in the course of such an auction. The supplier workspace 58 enables a supplier or vendor to search for and monitor on-line auctions, to analyze purchase requisitions, to submit bids to an on-line auction, and to negotiate contract terms directly with buyers.

The auction management software 18 also provides an administrator workspace 60 to enable a system administrator 62 to carry out maintenance tasks. This can include customizing system interfaces, downloading and uploading information, auditing system access and auction activity, and performing other administrative tasks. As shown in FIG. 4, the system administrator 62 is typically local to the server 12 and therefore need not be in communication with the server 12 over the interne.

The web browsers 16,28 retrieve dynamically generated HTML web pages provided by the server 12. Because HTML web pages by themselves offer limited interactivity, the dynamically generated web pages include JavaScript encoded objects that execute on an auction participant's own machine 10,24. For example, a JavaScript object can generate a bid form for a supplier to fill out in response to that supplier's communication of an intent to bid. The JavaScript object can then perform preliminary checking, for example by verifying the logical consistency of information entered into the bid form, before communicating with the server 12. This reduces the number of processing tasks executed by the server 12 and thereby reduces system latency.

To achieve a uniform appearance, the page formats are controlled by a cascading style sheet. These style sheets define a common presentation style for tables, forms, text, error messages, and other visual features.

The server 12 dynamically generates the web pages provided to the auction participant using Java servlets and JSPs (Java Server Pages) running under a JRun Pro servlet Engine. These servlets and JSPs, in conjunction with a business logic layer 64 and an infrastructure layer 66, carry out tasks and present information as requested by the buyer and the suppliers. The business logic layer 64 and the infrastructure layer 66 cooperate to perform the actual bid processing after retrieving or modifying appropriate information in one or more databases 68 using the data access layer 70. Within these two layers, Java servlets handle forms and both JSP and Java servlets interact to retrieve or modify data from the databases.

The business logic layer 64 includes a workflow engine 72 that configures the auction. Using the workflow engine 72, the buyer adds, deletes, and modifies requisitions for items and either specifies preferred suppliers or specifies criteria for selection of preferred suppliers. The workflow engine 72 then screens all bids to ensure that only bids from these preferred suppliers are entertained.

The workflow engine 72 also controls the status of the auction. For example, it is the workflow engine 72 that determines whether an auction is open for bidding, whether bids will no longer be accepted, either temporarily because the auction has been suspended or permanently because the auction has been closed. Once the buyer has carried out the optimization process described below, it is the workflow engine 72 that manages the award of bids.

The workflow engine 72 supplies those bids that qualify for further consideration to a bidding engine 74. For each bid passed to it by the workflow engine, the bidding engine 74 determines whether or not that bid meets the buyer's constraints. If it does, it passes information concerning that bid to an optimization engine 76. Otherwise, it rejects the bid and, optionally, communicates the reason for the rejection to the disappointed bidder.

At the close of the auction, the optimization engine 76 provides the buyer with the opportunity to apply private buyer constraints in different combinations or degrees. Examples of such private buyer constrains include business rules and the weighting of non-price factors associated with each supplier. Each set of private buyer constraints specifies a scenario for which the optimization engine 76 can determine the optimal set of suppliers and the optimal amount of business to award to those suppliers. The solution of the optimization problem is carried out by using API calls implemented in C to a collection of optimization routines 78 that are available under the trademark CPLEX. Depending on the size and complexity of the RFQ, the optimization engine 76 may support multiple threads running concurrently to handle multiple optimization requests.

By providing the opportunity to define scenarios without committing to the award of bids to those suppliers that the optimization engine 76 deems to be the optimal suppliers for that scenario, the optimization engine 76 enables the buyer to experiment with the imposition or relaxation of various private buyer constraints. For example, the buyer may discover that by suspending the application of a business rule, or by overlooking a supplier's historical performance, the total cost of satisfying the RFQ can be halved.

As suggested above, in the process of determining the optimal suppliers for a particular scenario, the optimization engine 76 may need information concerning the performance of the prospective suppliers in particular categories. For example, if the buyer deems that prompt delivery is crucial for a particular item in the RFQ, then the optimization engine 76 will need to know which suppliers have historically been able to deliver that particular item promptly, which suppliers have been able to deliver other items promptly, and which suppliers have consistently failed to deliver that particular item, or items in general, with sufficient promptness. Such information is stored in a database that is accessed by a supplier-performance engine 80 upon request by the optimization engine 76.

The supplier-performance engine 80 maintains a supplier-performance profile for a variety of performance factors. For example, the supplier-performance profile can include historical data on a supplier's ability to deliver quality goods, on a supplier's reluctance to correct non-conforming goods, on a supplier's solvency, on a supplier's dealings with competitors, and any other data that may be relevant to the buyer in considering whether or not to award a bid to a particular supplier.

The various engines associated with the business logic layer 64 call upon services provided by the infrastructure layer 66. These services, which are typically implemented using a WebLogic implementation of Enterprise Java Beans, include services that support distributed processing. Examples of such services include load balancing, messaging, authentication and authorization, and integration with external components such as enterprise systems.

Within the infrastructure layer 66, an authorization service 82 controls whether or not the buyer or particular suppliers can access specified information. In addition, the authorization service 82 enables the workflow engine 72 to screen particular suppliers on the basis of criteria provided by the buyer.

The infrastructure layer 66 also includes an integrated messaging service 84 that enables communication between the buyer and the various suppliers for negotiation of terms in a proposed transaction. The messaging service 84 enables both point-to-point communication and broadcast communication. For example, if a supplier asks a question about a particular item and the buyer observes that the response to that question may be pertinent to other suppliers, that buyer can use the integrated messaging service 84 to broadcast the response to those other suppliers.

A transaction-management service 86 associated with the infrastructure layer 66 coordinates transactions by logging each new bid and either accepting or rejecting that bid. When the buyer ultimately selects which suppliers to use for supplying a particular item or group of items, the transaction-management service 86 coordinates the process of awarding bids. In doing so, the transaction-management service 86 marks that bid as awarded and notifies other suppliers that may have bid on that item or group of items that the bid has been awarded. The transaction-management service 86 then generates a purchase order.

Since the HTTP protocol is inherently stateless, it is necessary to keep track of the state associated with each buyer and supplier. This is achieved by a session-management service 88 that tracks the activities of each buyer and supplier who participates in an auction managed by the auction management software 18.

The data access layer 70 includes logic required to read from one or more databases 68 used by the auction management software 18. These databases 68 include information on historical performance factors associated with each supplier, as well as information on the various items that the buyer has specified in the RFQ.

The auction management software 18 also provides an integration interface 90 to provide communication to the enterprise system 20. The integration interface 90 includes an XML integration interface 92 that communicates directly with databases 68. In addition, the integration interface 90 includes a Java API 94 and an RMI API 96 that provides communication between the enterprise system 20 and the infrastructure layer 66.

Organization of User Interface

Figure 5:
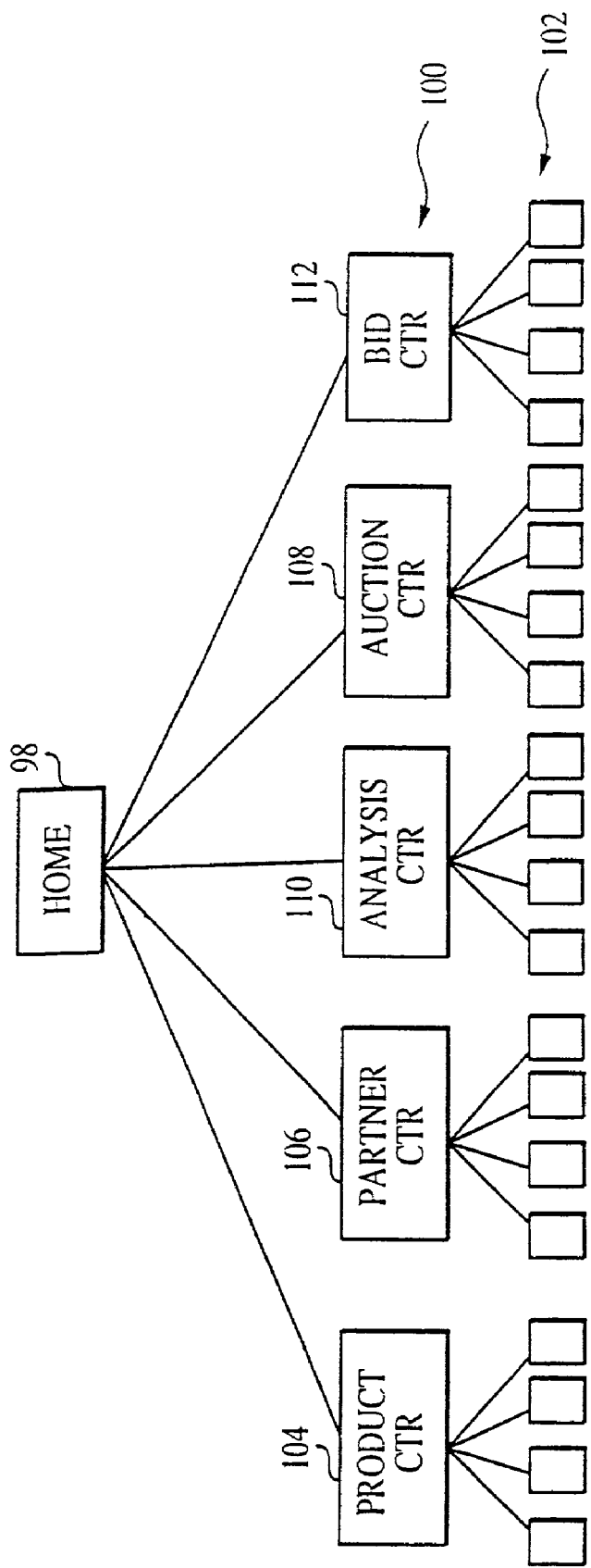
FIG. 5 shows the tree structure of the user-interface of the auction management software of FIG. 1.

The presentation layer 54 provides a user-interface that consists of dynamically-generated web pages arranged in a tree structure as shown in FIG. 5. The user-interface provides a home page 98 from which an auction participant can jump to several "centers" 100 depending on the nature of the auction participant's role in the auction. Each of these centers leads to a collection of hyper-linked web pages 102 that guide the auction participant through the various tasks using graphical interface features such as forms, buttons, and tabs.

An auction participant who is a buyer will generally jump to the product center 104 to create or modify an RFQ, to the partner center 106 to specify performance factors for selected suppliers, and to an auction center 108 to create and open an auction in which buyer constraints are published to selected suppliers. Following the close of the auction, the buyer typically jumps to an analysis center 110 to determine the optimal award schedule. From each of these centers the buyer can access web pages for assistance with the details of each of the foregoing tasks.

An auction participant who is a supplier typically jumps to the auction center 108 to identify what bids are open and to the product center 104 to view RFQs. Having done so, the supplier can then jump to a bid center 112 to submit bids.

Setting up an Auction

The auction management software 18 requires that all suppliers and buyers participating in an auction be registered. The registration process includes the identification of a participating organization, a classification of that organization into either a buyer or a supplier, and the identification of those individuals within that organization who are authorized to represent the organization at an auction. A request for registration includes information identifying the authorized representatives of the organization. Such information typically includes an email address for use by the integrated messaging service 84, a telephone number, and a password.

Figure 6:
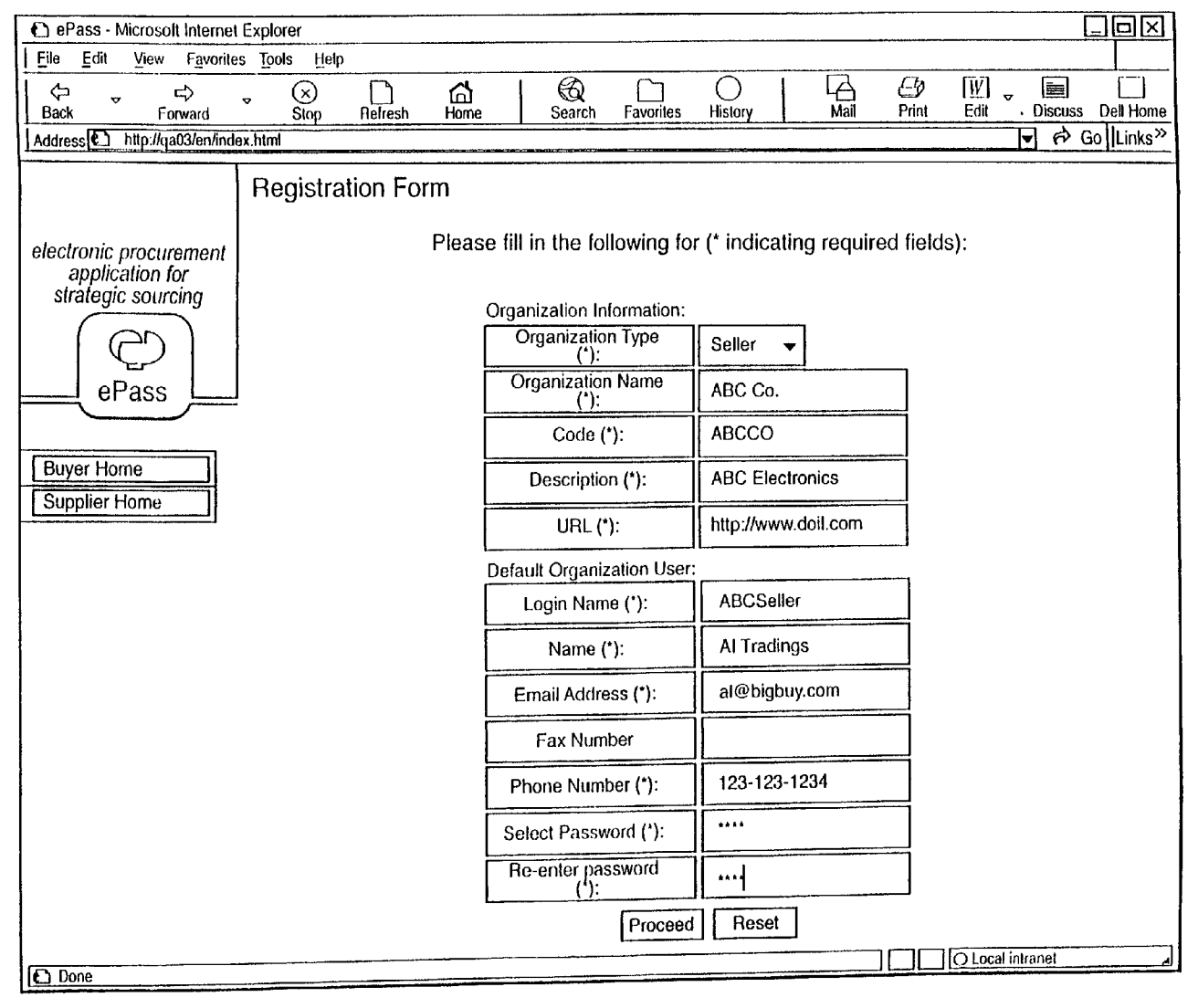

An auction participant can register on-line by submitting a dynamically generated web page, as shown in FIG. 6. Alternatively, the request for registration can be submitted to a system administrator 62. To maintain control over access to the auction management software, the system administrator 62 grants or declines the registration application of each organization.

Creating an RFQ

In preparation for an auction, a sequence of web pages originating at the product center 104 guides the buyer in preparing a list of items to be requisitioned. This list can contain a description of the item, a desired number of units of that item, and any other information a supplier would need to make an informed bid on those items. By imposing contract terms that are required by the buyer in any prospective contract with a supplier, this requisitions list defines a set of buyer constraints. These buyer constraints are public buyer constraints because they are published, or provided, to suppliers.

Figure 7:
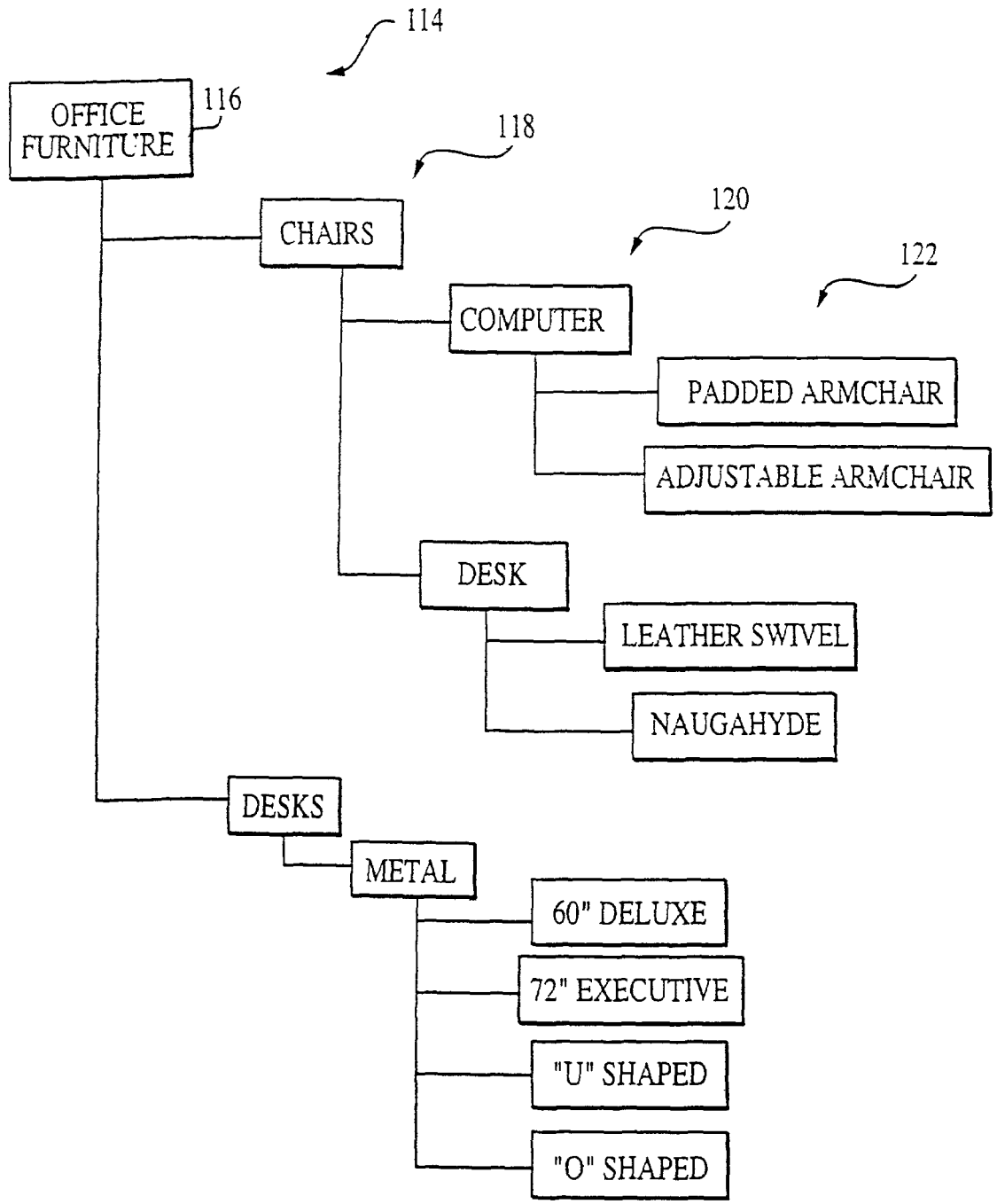
FIG. 7 is a diagram of a representative requisition.

An RFQ consists of a list of requisitions, each of which includes a list of logical items. A logical item, also referred to as a "group," can be a specific good or service, a category or sub-category that contains that good or service, or any combination of goods, services, categories, and sub-categories. As shown in FIG. 7, the RFQ can thus be viewed as a tree 114 in which a requisition 116 corresponds to the root node of the tree, categories 118 and subcategories 120 correspond to intermediate nodes of the tree, and the individual items 122 correspond to the terminal nodes of the tree. In the example of FIG. 7, the requisition 116 is for "office furniture," and the categories 118 are "desks" and "chairs." The category "desk" has two subcategories 120: "computer" and "desk." The individual items 122 are the terminal nodes, such as "padded arm chair" and "leather swivel."

The above data structure enables a supplier to freely organize groups of goods and services into units on which bids are accepted. For example, in FIG. 7, a first supplier can propose a price for all chairs, for all desk chairs, or for all leather swivel chairs. A second supplier might propose a price for the entire office furniture requisition. The optimization engine parses the bids from the first and second supplier to enable comparison of the bids on a cost-per-item basis.

Within the RFQ, the buyer can provide additional buyer constraints by aggregating logical items to form an indivisible set. When the buyer aggregates items into an indivisible set all suppliers must bid on that set as a whole. They cannot selectively bid on logical items within that set. In the context of FIG. 7, a buyer might require that a supplier cannot bid on only leather-swivel chairs, but must instead bid on desk chairs generally.

The buyer can also relax certain buyer constraints by permitting substitutions for selected logical items in the RFQ. For example, a buyer who intends to purchase 100 bars of white soap can indicate, on the web page provided to the supplier, that he will consider an offer to supply cream colored soap under the same terms.

The buyer can specify additional buyer constraints that will ultimately be communicated to the supplier on a dynamically generated web page. Examples of such additional buyer constraints include: a minimum or maximum quantity bid for a logical item, a preferred delivery date, and a reserved price, which is the maximum price the buyer is willing to pay, and a historical price.

Figure 8:
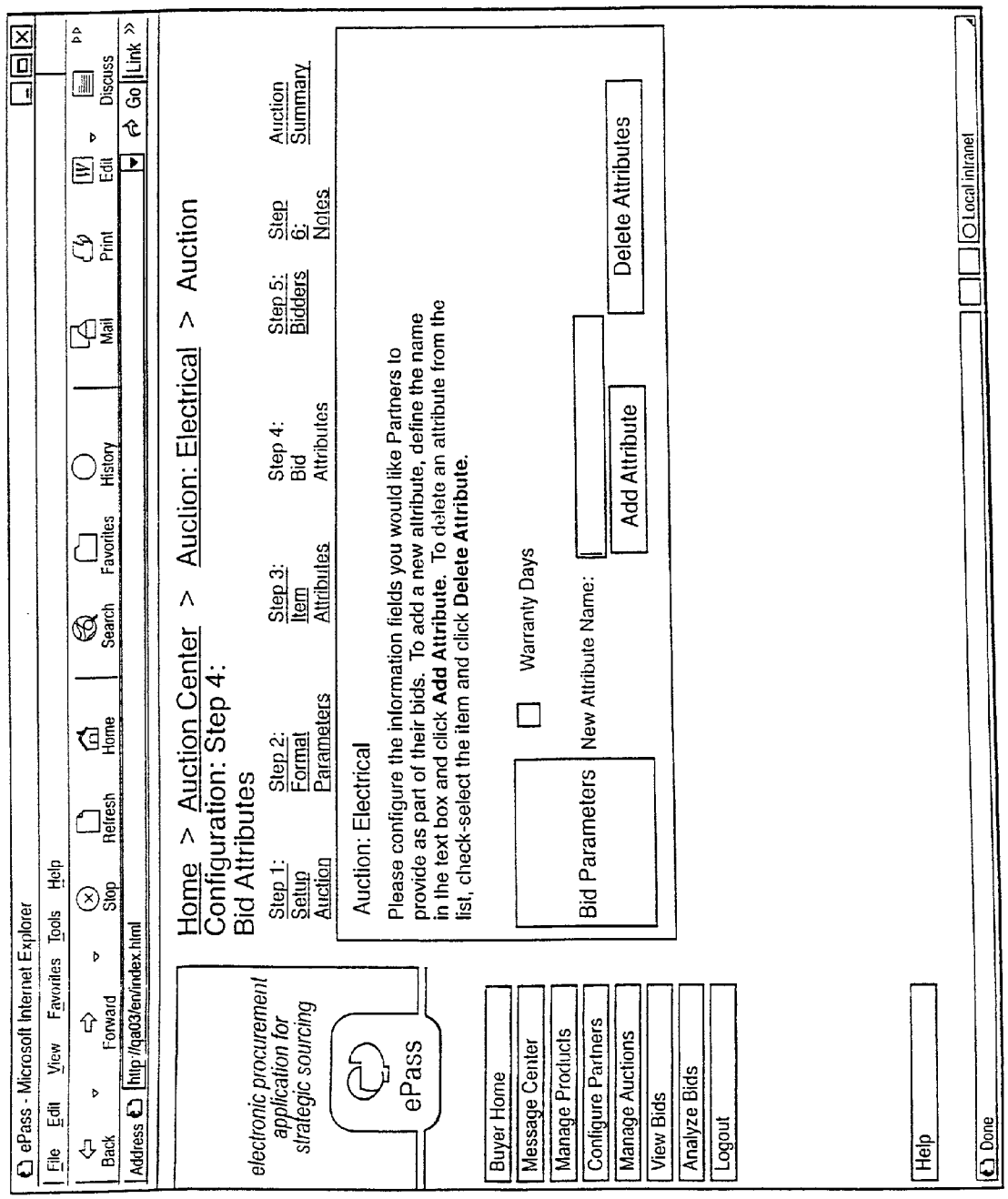
FIG. 8 is a web page created by a buyer requesting that bids include warranty information.

For some logical items, it may be useful to provide ancillary information or to solicit proposed contract terms that may not normally be included in a bid. For example, the buyer may wish to ensure that a particular item comes with a warranty, or the buyer may request information on how many days a warranty would last. Under these circumstances, the buyer can cause a text box to appear in the bid form supplied by the auction managing software to the supplier. FIG. 8 shows a web page being created by a buyer who wishes to solicit warranty information. When a supplier ultimately views this web page, a text box soliciting warranty information will appear to the supplier.

Finally, the RFQ specifies whether the auction is to be a sealed auction, in which case suppliers do not have access to bids made by other suppliers, or a Dutch auction, in which case they do.

Creating Supplier Profiles

Before the auction begins, the buyer can prepare a set of supplier profiles using the supplier-performance engine 80. Each supplier profile includes one or more performance attributes. Each performance attribute is a score that rates how a particular supplier has historically performed in a particular area. For example, if a supplier historically delivers high quality goods but always does so a week or two late, this information will be reflected in an appropriately low value of that supplier's performance attribute for punctuality. Alternatively, if a supplier consistently delivers on-time, but the items delivered are shoddy, that supplier might receive high marks for the punctuality performance attribute and low marks for the quality performance attribute.

In addition to performance attributes associated with a specific quality, the supplier-performance engine 80 also provides for an overall performance attribute for a supplier. The supplier-performance engine 80 can assign an overall performance attribute on the basis of an average or weighted average of the more specific performance attributes. Alternatively, the value of the overall perfoimance attribute can be assigned independently of the values of the more specific performance attributes.

Figure 9:
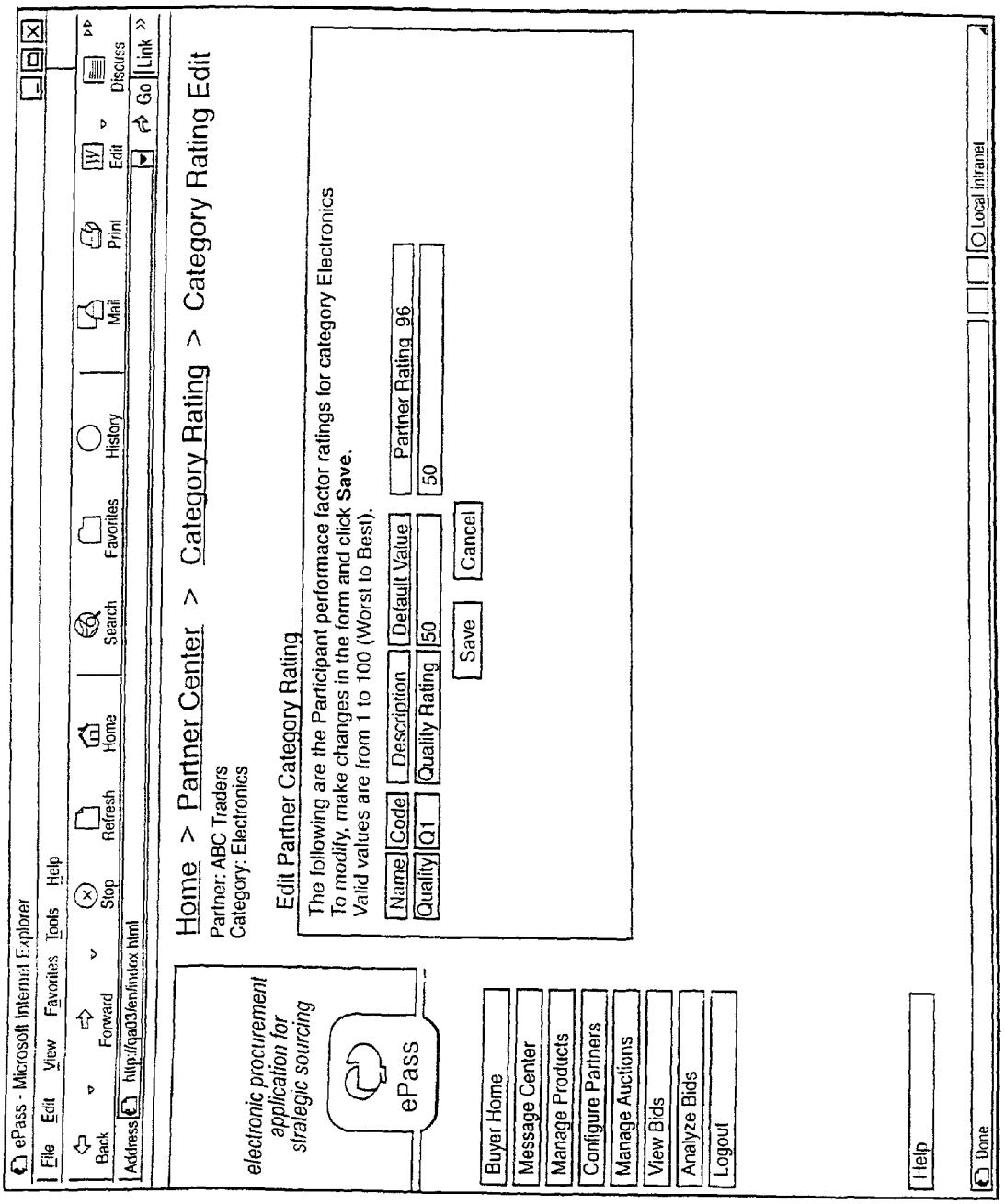
FIG. 9 is a web page for assigning a non-price attribute or performance attribute to a particular supplier.

FIG. 9 shows, for a particular supplier, a dynamically-generated web page accessible from the partner center 106. The illustrated web page is one that a buyer, or third party rating service would use to assign a performance attribute rating to a supplier. For the web page of FIG. 9, the performance attribute indicates ABC Trader's reputation for high quality electronics. If no score has been assigned to a particular supplier in the particular category, the bidding engine 74 assumes a default value of 50%, as shown in FIG. 9.

Opening the Auction

Figure 10:
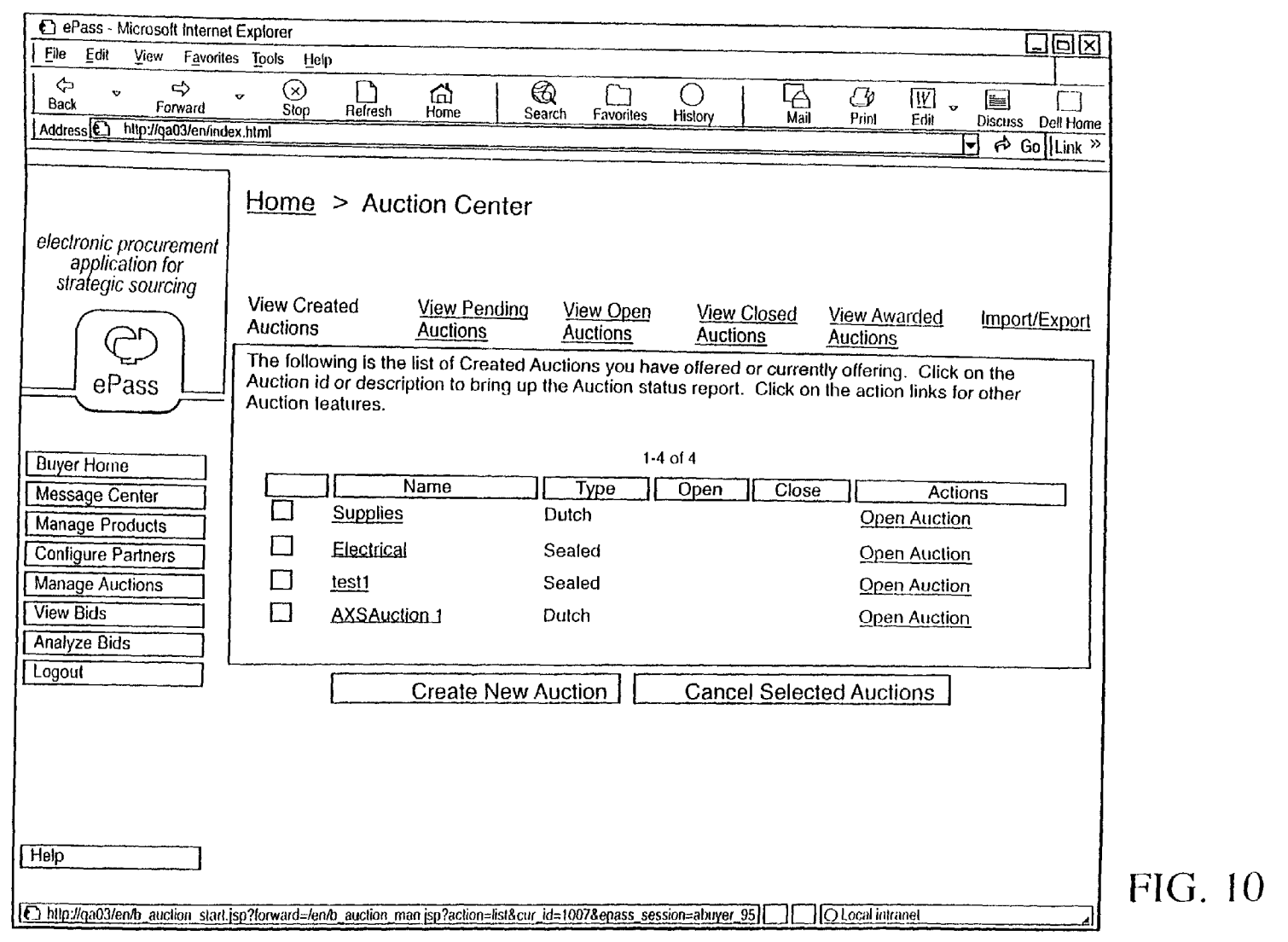
Figure 11:
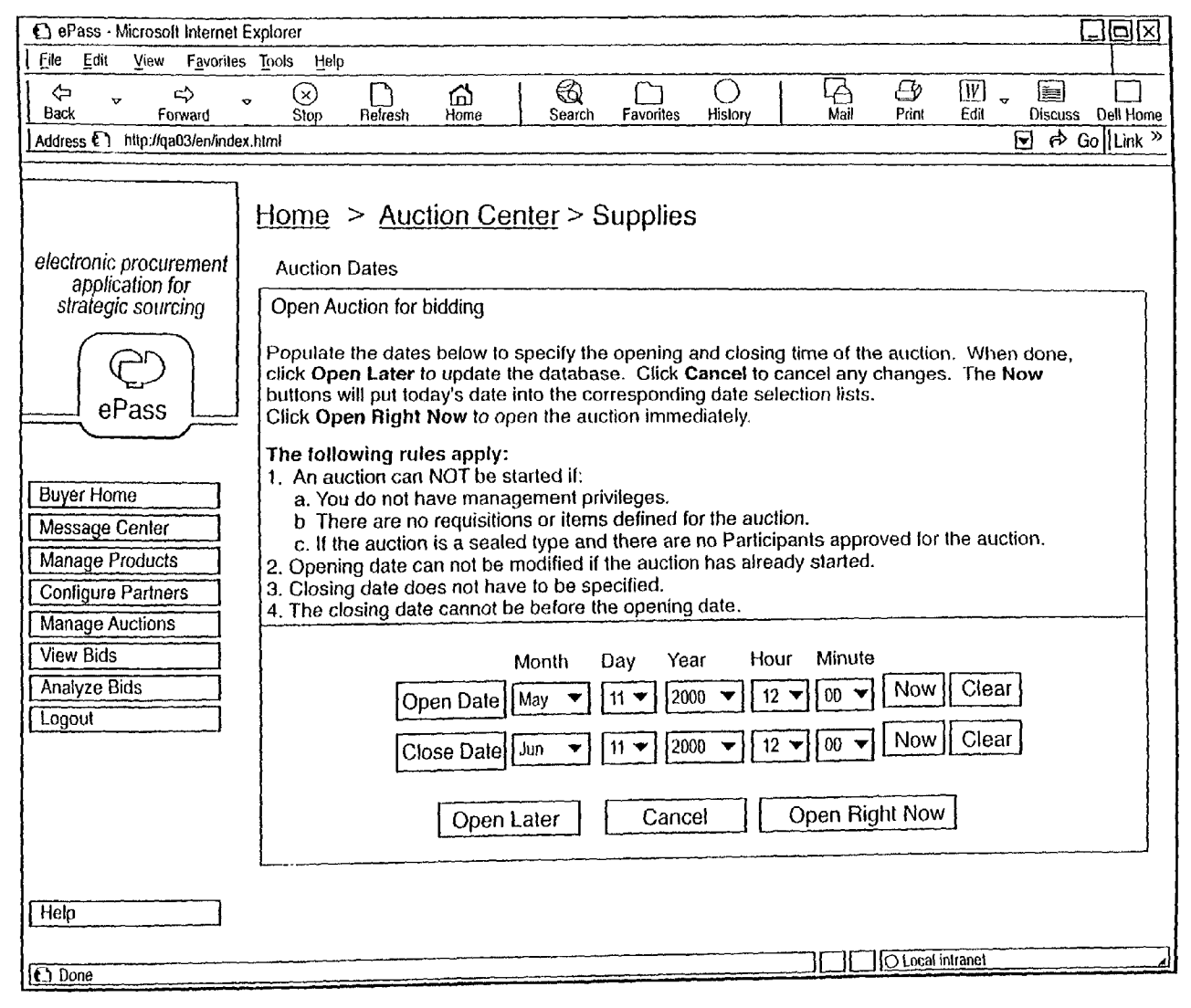

Once the RFQ has been created, a sequence of dynamically-generated web pages originating at the auction center 108 enables the buyer to open the auction. FIG. 10 shows one such web page provided to a buyer who intends to open the "Supplies" auction for bidding. The illustrated web page includes graphical elements that invite the buyer to specify an opening date and a closing date for an auction. Selecting "Supplies" and clicking on the "Open Auction" link causes the display of the web page shown in FIG. 11. By clicking on the "Open Right Now" button of FIG. 11, the buyer can immediately open the auction. Alternatively, the buyer can set an opening date and time other than the current date and time.

Figure 12:
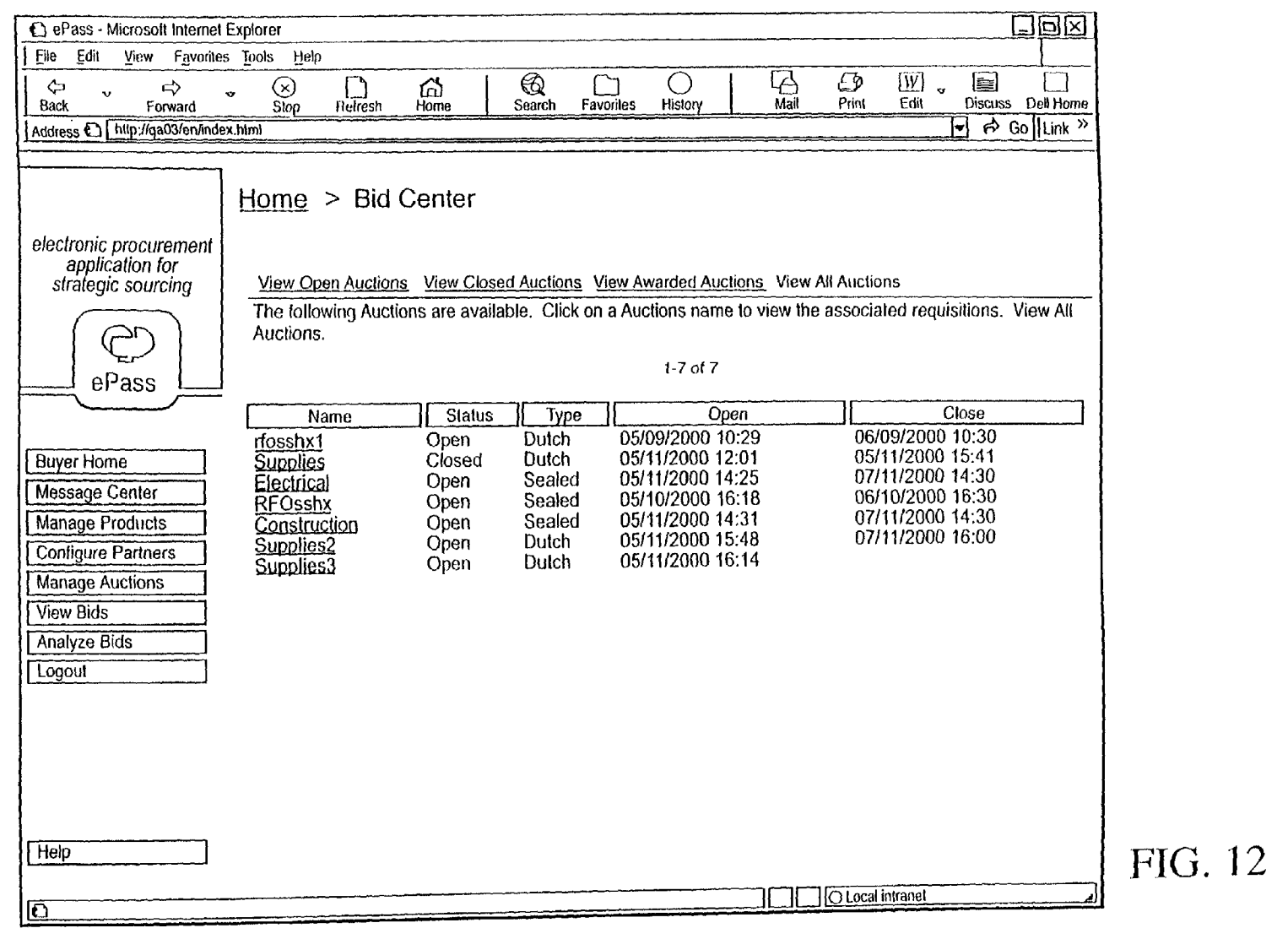

The suppliers are able to view available auctions using a web page originating at the bid center 112. As shown in the representative web page of FIG. 12, such a web page lists those auctions in existence and the state of each auction. An auction can be in one of five possible states. The auction can be created, in which case it has not been scheduled for opening. The auction can be pending, in which case it is scheduled to open on a specific date and time in the future. An auction can be open, in which case bids are being accepted, or closed, in which case no new bids are being accepted. Finally, an auction can be completed, in which case the buyer has already made awards to selected suppliers.

Bidding at an Auction

Figure 13:
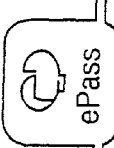
FIG. 13 is a web page used by a supplier to view open requisitions at an auction prior to bidding.
Figure 14:
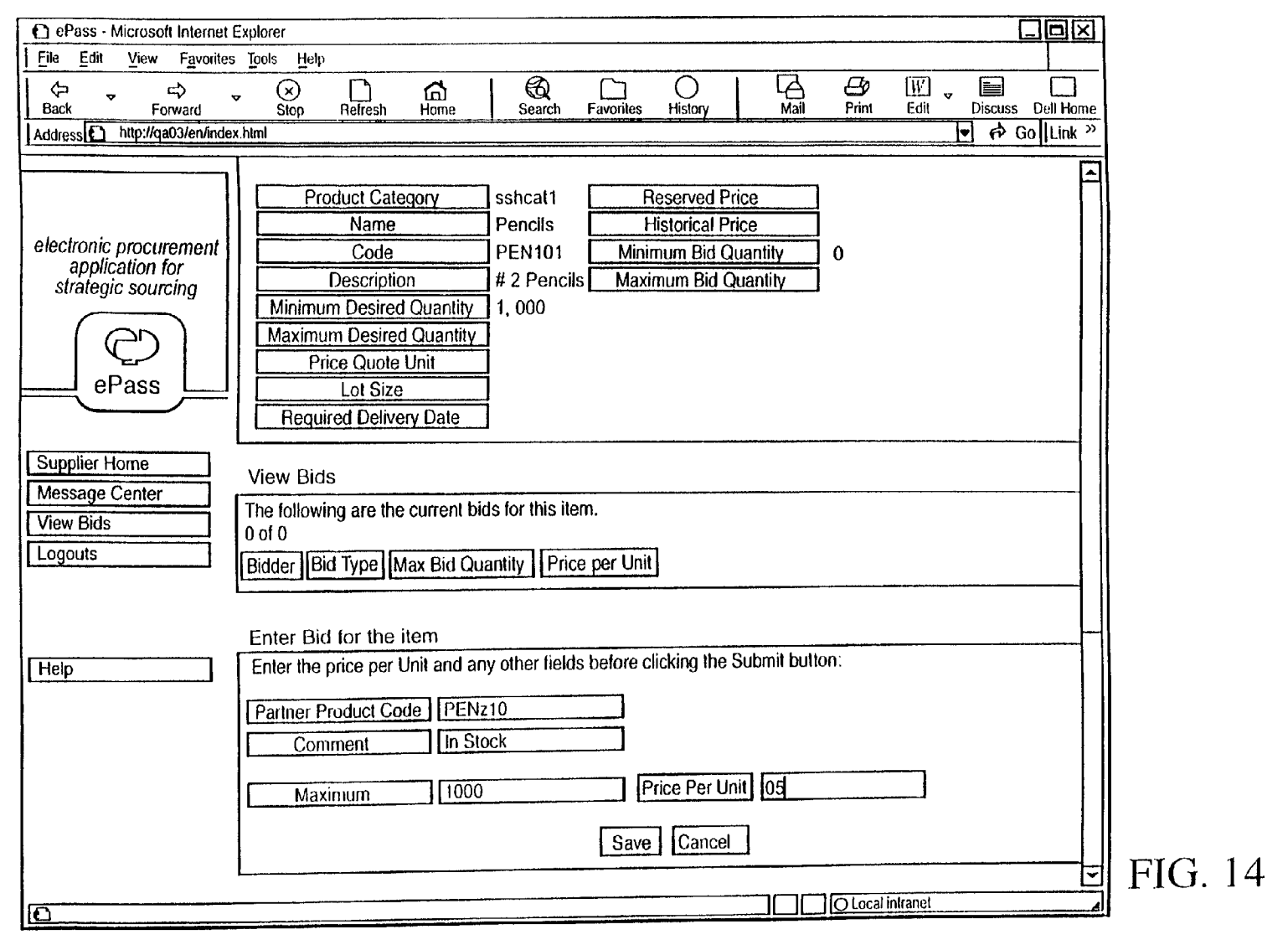

To bid at an auction, the supplier accesses a web page originating at the bid center 112. FIG. 13 shows a typical web page that would be seen by a supplier viewing an auction. In this particular auction, named "Supplies 2," a buyer has requisitioned certain pencils, lined paper, and fax paper. At the end of each requisition shown in FIG. 13 are two links: a "Bid" link and a "Messages" link. The "Messages" link, which invokes the integrated messaging service 84 of the infrastructure layer 66, is used by a supplier who seeks additional information or wishes to negotiate terms directly with the buyer. The "Bid" link leads to a web page, shown in FIG. 14, through which the supplier can submit a bid for the selected item. In this case, the buyer has clicked the "Bid" link next to the "Pencils" requisition of FIG. 13. As shown by the bid box, this supplier is offering to supply all 1000 pencils for $0.05 per pencil.

Figure 15B:
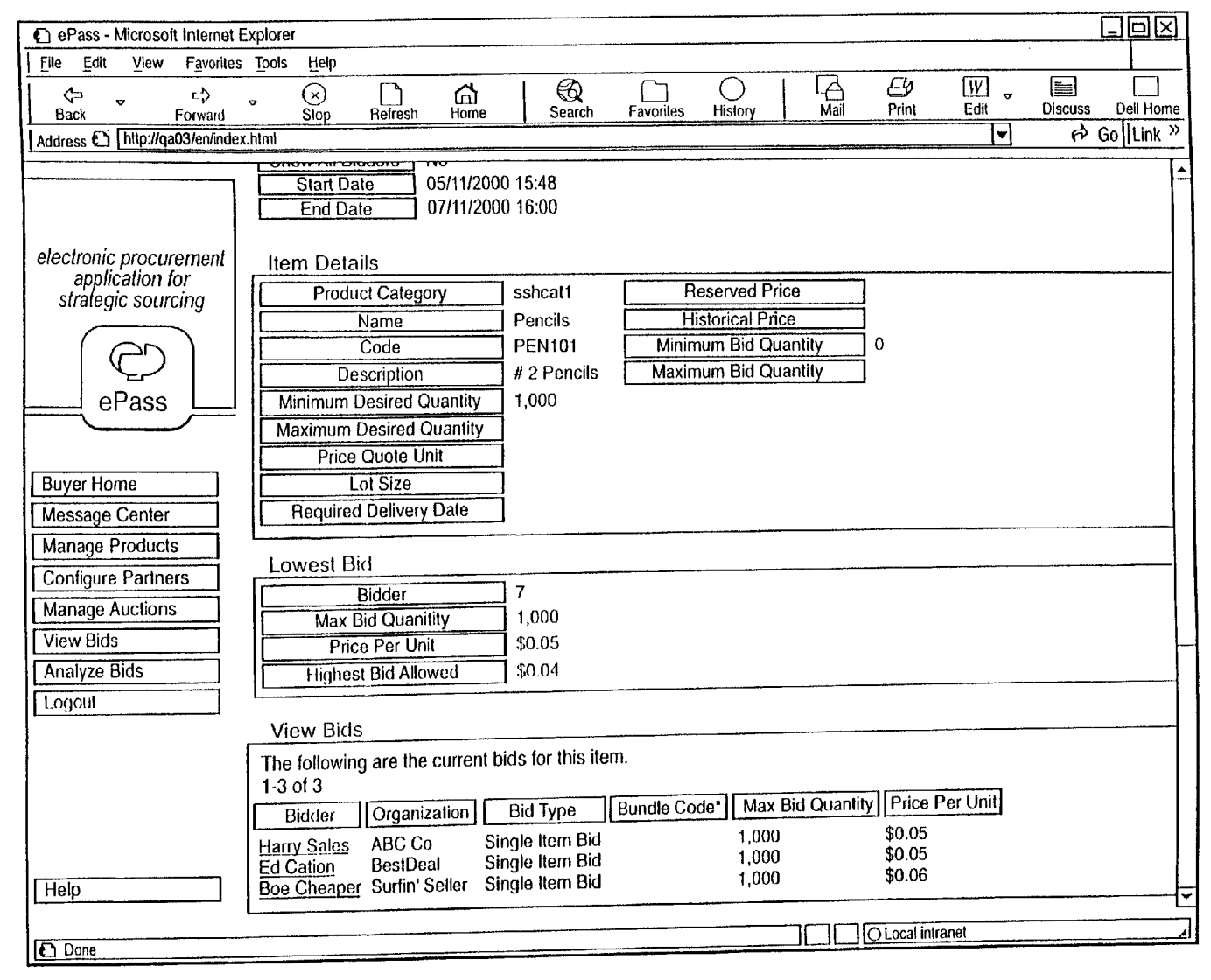

In the case of a Dutch auction such as the "Supplies 2" auction of FIG. 13, a supplier can view the outstanding bids. FIGS. 15A and 15B show the upper and lower portions of a web page from which one learns that the buyer is interested in buying 1000 #2 pencils and will accept offers to supply even small numbers of pencils. A supplier viewing this bid page can also learn that the lowest bid thus far is a bid to supply 1000 pencils for $0.05 per pencil.

In a sealed auction, the structure of a bid can become more complex. This is because in a sealed auction, the auction management software 18 supports bids having item-volume discounts, business-volume discounts, fixed charges, bundled bids, and enforcement of minimum and maximum bid quantities.

A bid having an item-volume discount is one in which the unit price of an item depends on the number of items ordered. There are two kinds of item-volume discount: a flat rate discount and a progressive discount. In a flat rate discount, the unit price of each unit is a function of the total number of units purchased. In a progressive discount, the item-volume discount applies only to those items that are in excess of a threshold. In either case, the item-volume discount can be coupled to the number of units of another item that is purchased from the same supplier.

A bid having a business-volume discount is one in which a supplier offers a discount that depends on a buyer's overall business volume. The business-volume discount is triggered when a buyer's combined spending on the purchase of two or more selected items exceeds a volume-discount threshold. In the following discussion, a "discount set" is the set of all items that, when purchased, contribute toward triggering a business volume discount. The elements of the discount set are referred to as "qualifying items".

The business-volume discount can be viewed as a function whose value depends on the sum of all qualifying-item purchases, hereafter referred to as the "qualifying-item volume". In one embodiment, the value of the business-volume discount is zero until the qualifying-item volume allocated to its discount set reaches a volume-threshold. When the qualifying-item volume surpasses that threshold, the value of the business-volume discount assumes a fixed value that no longer depends on the qualifying-item volume. The fixed value can be an amount to be subtracted from cost of the buyer's total business-volume, or it can be a percentage by which that cost is to be reduced. A business-volume discount of this type thus resembles a step function.

In another embodiment, a plurality of volume thresholds define intervals, or segments, of the business-volume discount. In this embodiment, the value of the business-volume discount depends on which segment the qualifying-item volume falls within.

A supplier can define several business volume discounts, each with its own associated discount set. In general, a qualifying item that belongs to one discount set can also belong to another discount set. When such an item is purchased, the marginal volume resulting from that purchase must be allocated to only one of the possible discount sets.

A bid having a fixed charge is one in which a per item cost is added to a flat fee. In many ways, this is analogous to a volume discount because the effective per item cost decreases with volume as the effect of the flat fee is amortized over more items. However, this effect is achieved in a converse manner, by effectively penalizing small orders rather than rewarding large orders.

Figure 16A:
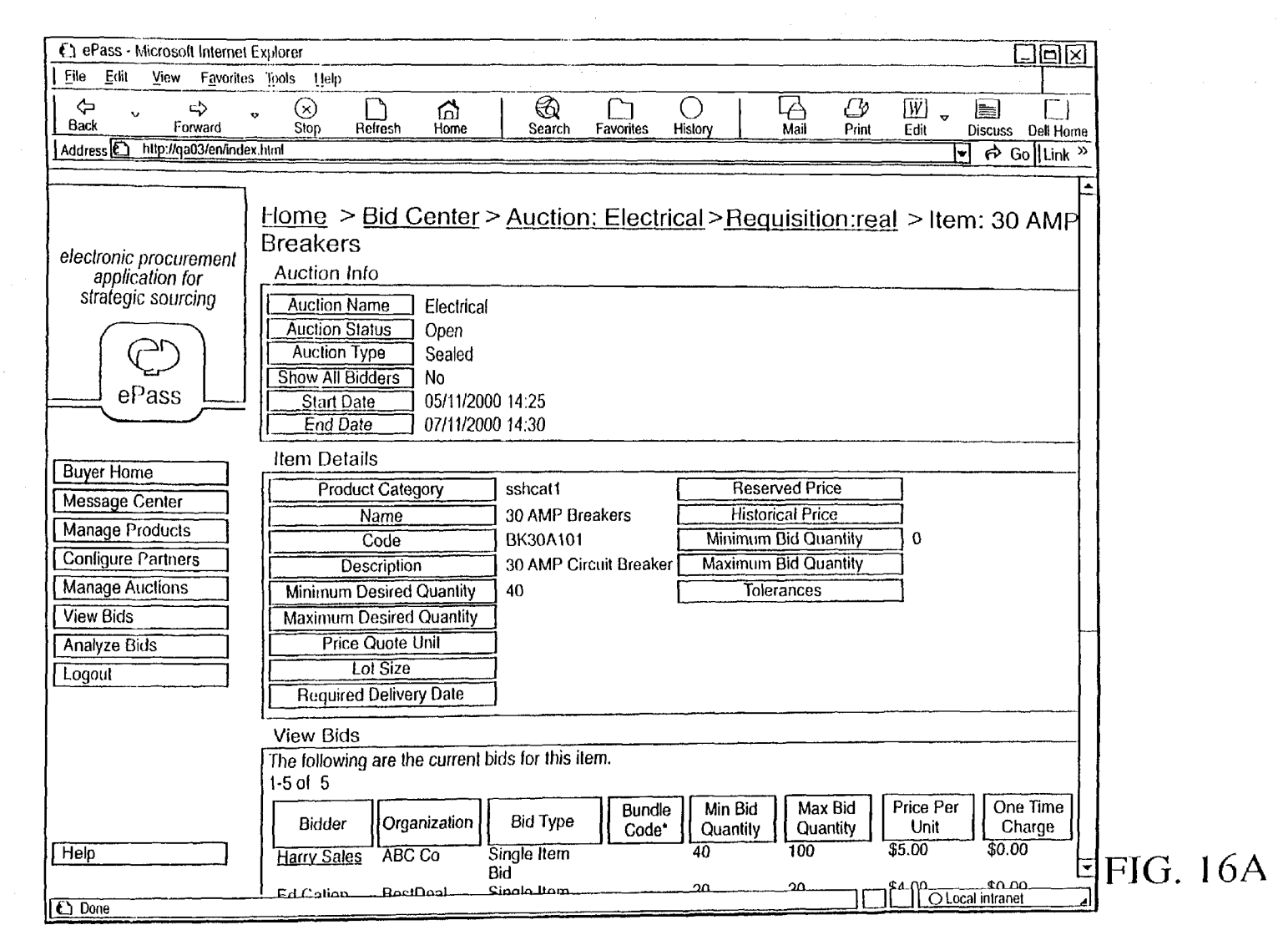
Figure 16B:
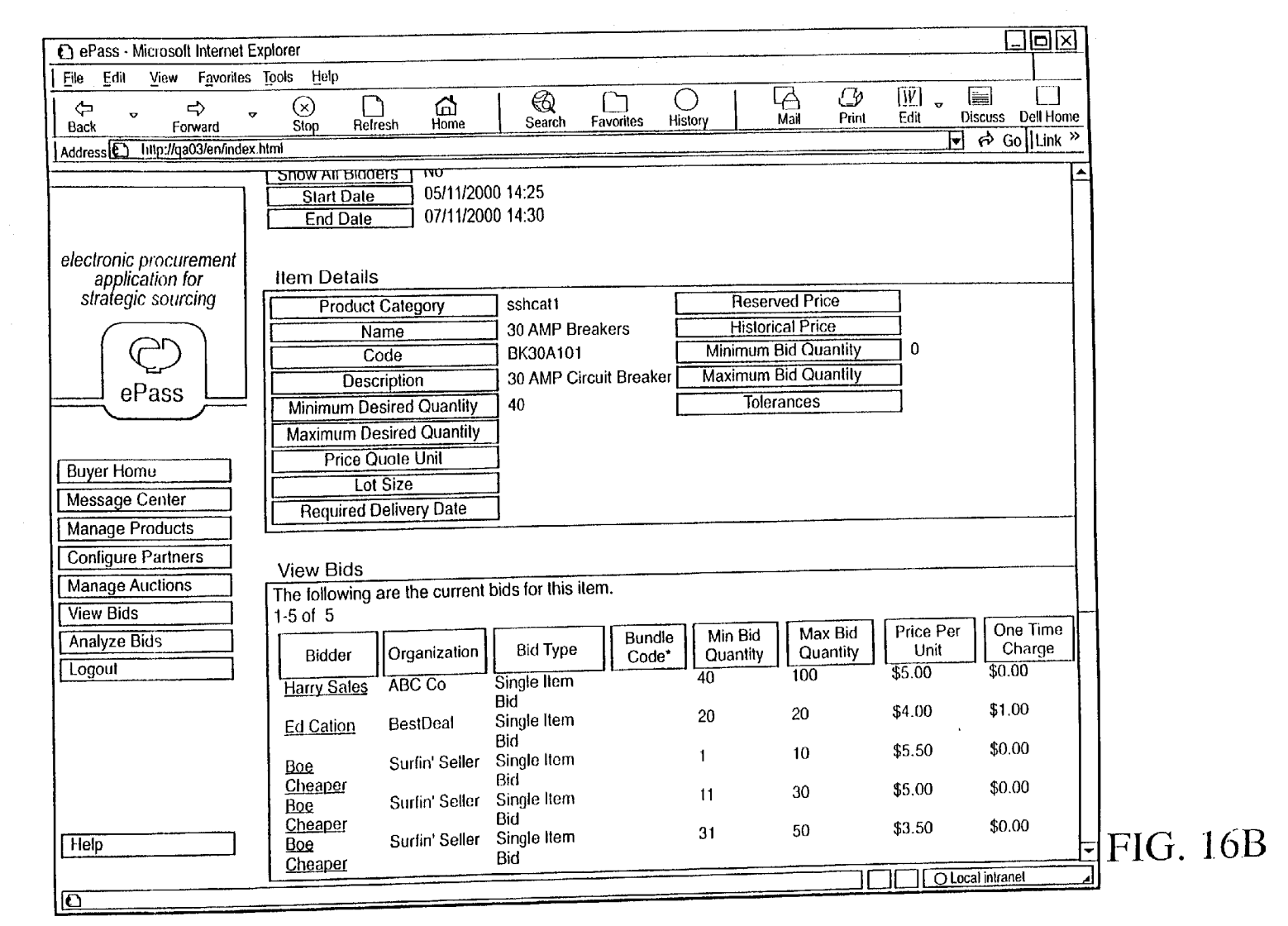

FIGS. 16A and 16B show upper and lower portions of a web page that illustrates bids having volume discounts and fixed charges. Such a web page might be presented to a buyer who is reviewing outstanding bids for supplying 30-amp circuit breakers in a sealed auction named "Electrical." The various fields in the "View Bids" section show where additional complexity can arise. For example, the price of a circuit breaker from Bee Cheaper of Surfin' Seller appears to depend on how many circuit breakers one purchases. Ed Cation of BestDeal charges only $4 per circuit breaker but imposes a one-time charge that is independent of the number of circuit breakers offered.

Figure 17:
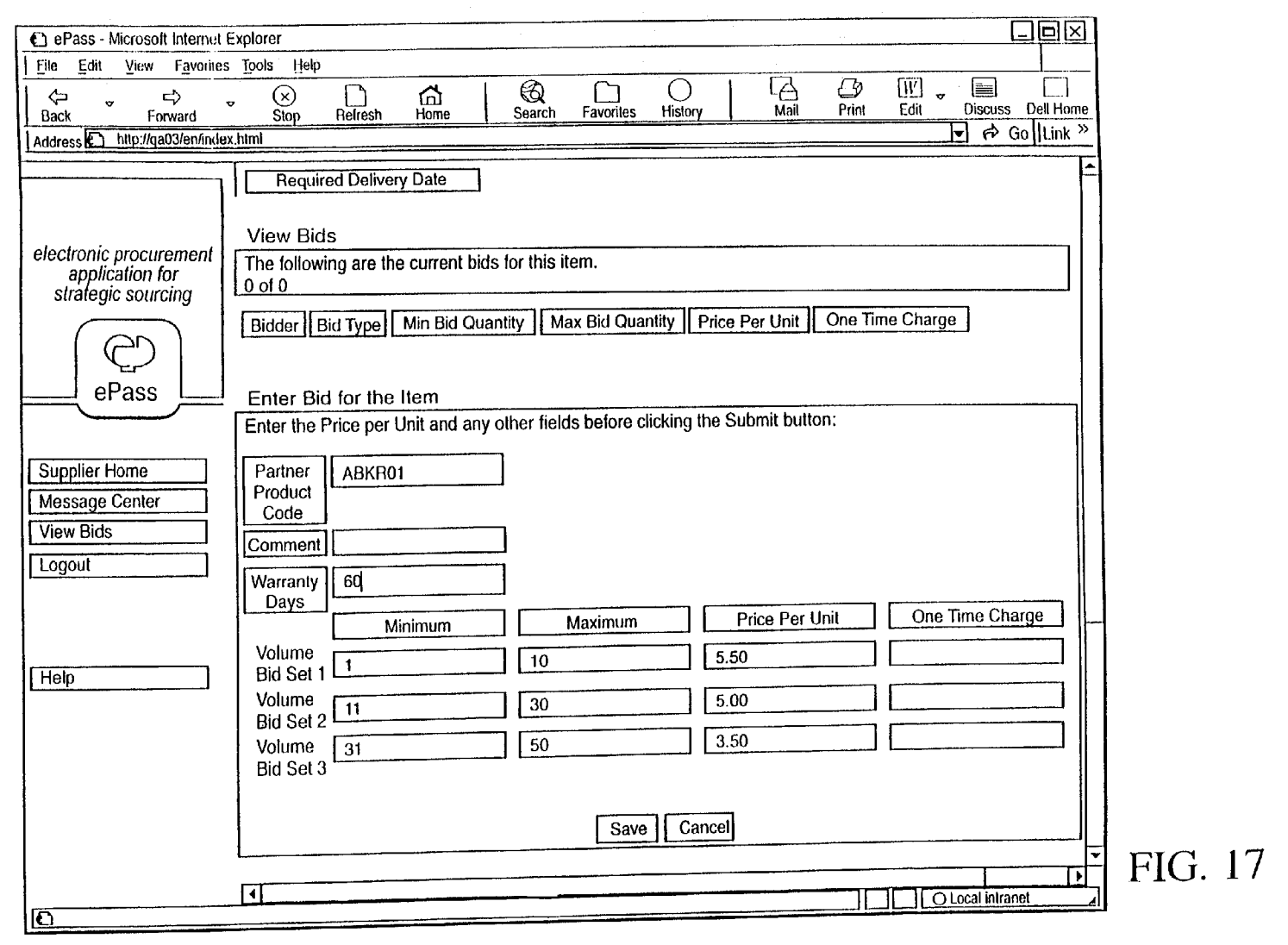

In a sealed auction, a supplier can also submit a bid with a volume discount, as shown in FIG. 17. The illustrated web page includes a form having text boxes in which the supplier can specify the price per unit for different ranges of units ordered. In addition, the form includes text boxes for including a one-time charge in connection with any range of units ordered.

A bundled bid is one in which a supplier proposes to supply two or more different items for one specified price that aggregates all items. Bundled bids pose computational difficulties because it is not always clear how to allocate the one specified price among the different items. FIG. 18 is an example of a bundled bid by "Surfin" together with two conventional bids. In this relatively simple case, one can determine by inspection that the bundled bid is a lower cost alternative to either of the two conventional bids. However, depending on the numbers involved, a bundled bid can introduce considerable complexity into the problem of determining an optimal award schedule.

Figure 20A:
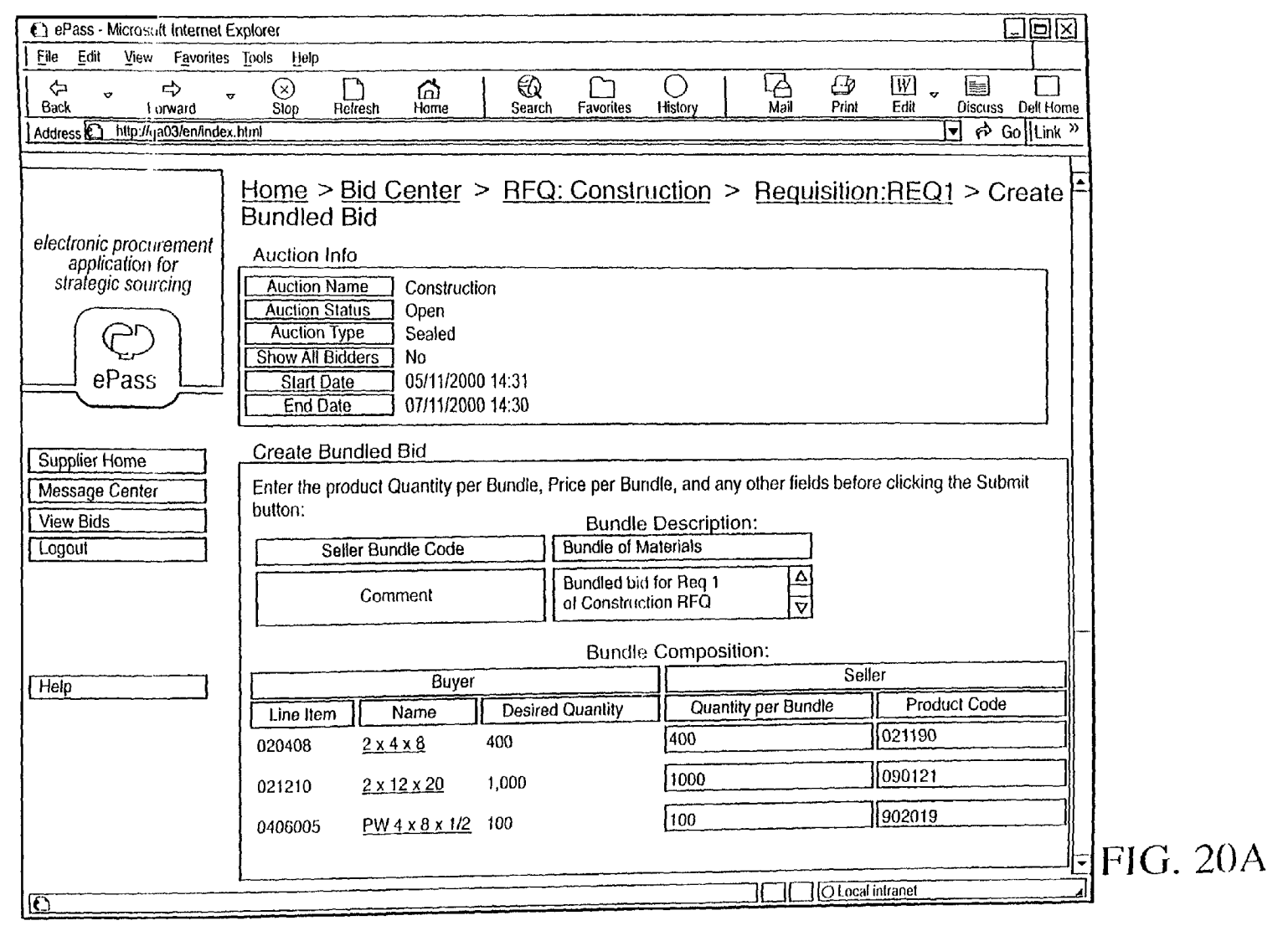
Figure 20B:
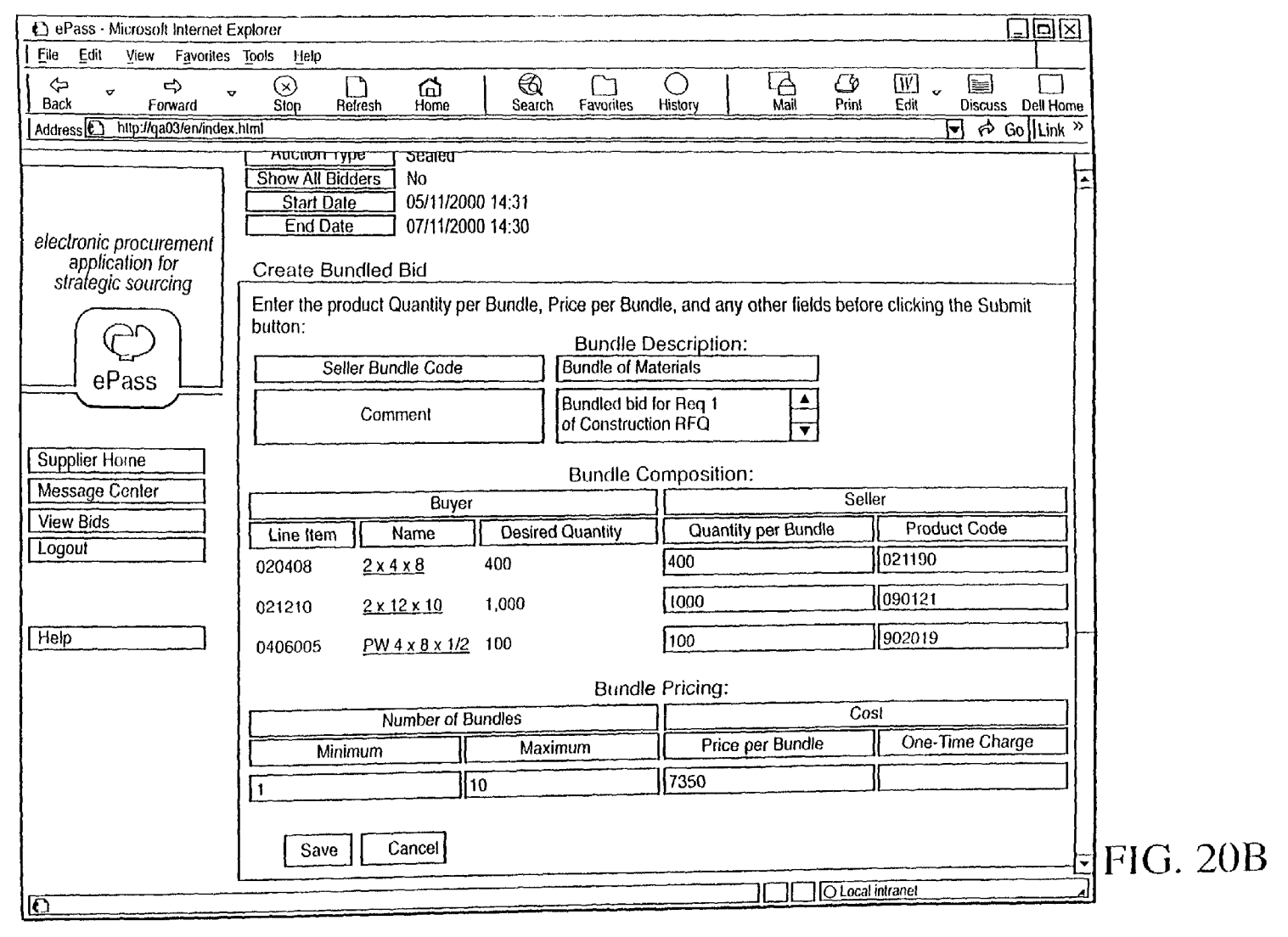

In an auction for which bundled bids are supported, a web page originating at the bid center 112 and similar to that shown in FIG. 19 invites the supplier to make a bundled bid. To create a bundled bid, the supplier checks those items that are to be incorporated into the bundle and clicks the "Create Bundled Bid." Doing so generates a web page as shown in FIGS. 20A and 20B. For each item in the bundle, the supplier specifies how many units of each item are to be included in the bundle (400, 1000, and 100 respectively). The buyer then specifies the offer price for the bundle ($7350) and the number of bundles available (1-10). These are all shown in the lower half of the web page, shown in FIG. 20B.

Closing the Auction

When opening an auction, a buyer has the option of specifying a time at which the auction will close. When the specified time arrives, the workflow engine 72 automatically closes the auction.

An alternative method of closing the auction is for the buyer to select the auction from a list of auctions available from the auction center 108 and to click on a button instructing the workflow engine 72 to close the auction.

Analyzing Bids

Once the auction is closed, the buyer can analyze the bids to determine the optimal award schedule. In doing so, the buyer has the opportunity to impose additional constraints, referred to as private buyer constraints, on the optimal award schedule. Each combination of private buyer constraints defines a scenario. A buyer can define several scenarios during the course of analyzing the bids. This allows the buyer to observe the effect of imposing and relaxing different combinations of private buyer constraints.

Figure 21:
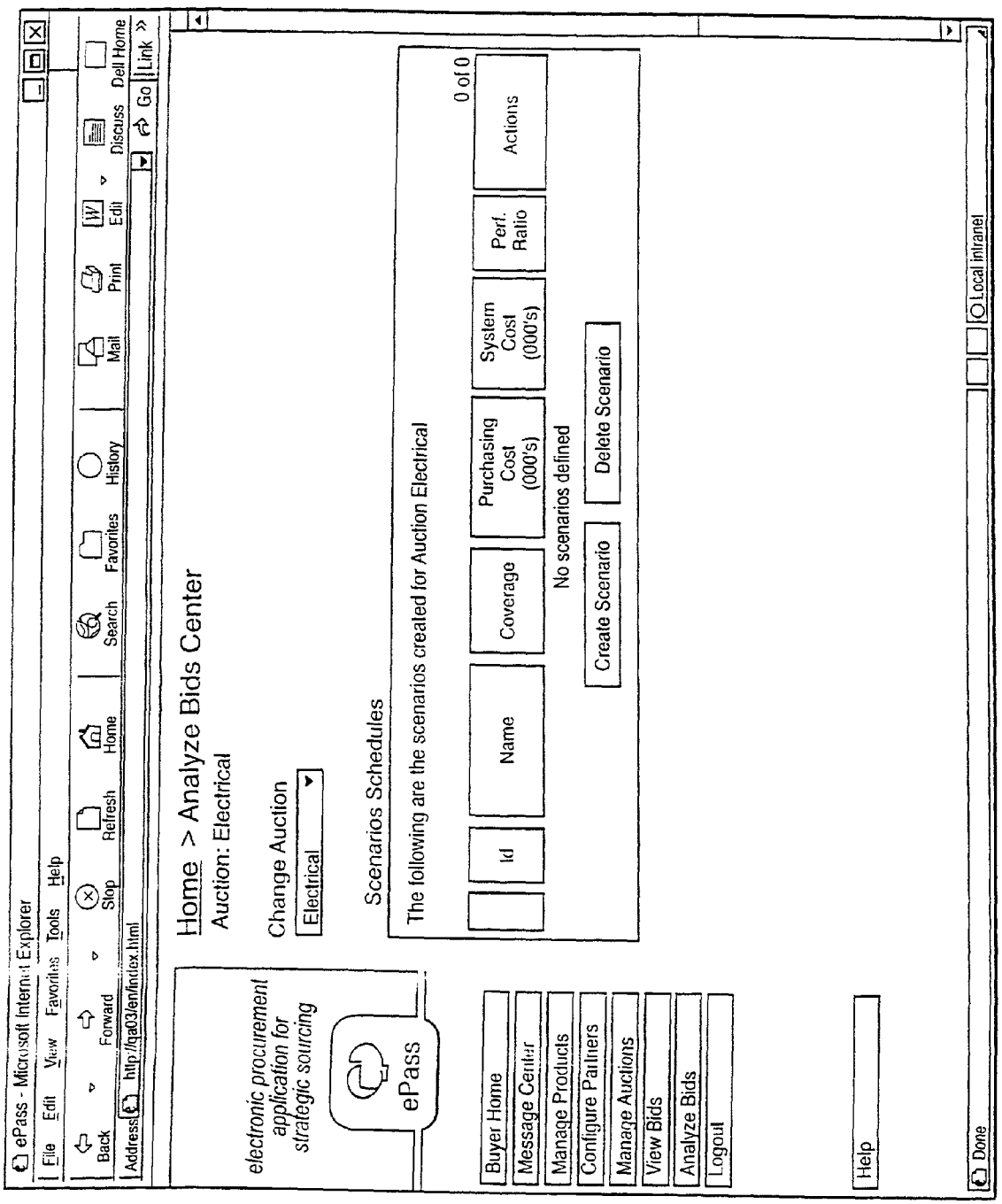
FIG. 21 is a web page for commencing the scenarios definition process for a particular auction.

The buyer defines a scenario by using web pages accessible from the analysis center 110. FIG. 21 shows one such web page that lists scenarios associated with an auction called "Electrical." As is apparent from this web page, the buyer has not yet created any scenarios for this auction. The illustrated web page invites the buyer to do so by providing a "Create Scenario" button that leads to the web page shown in FIG. 22.

Figure 22:
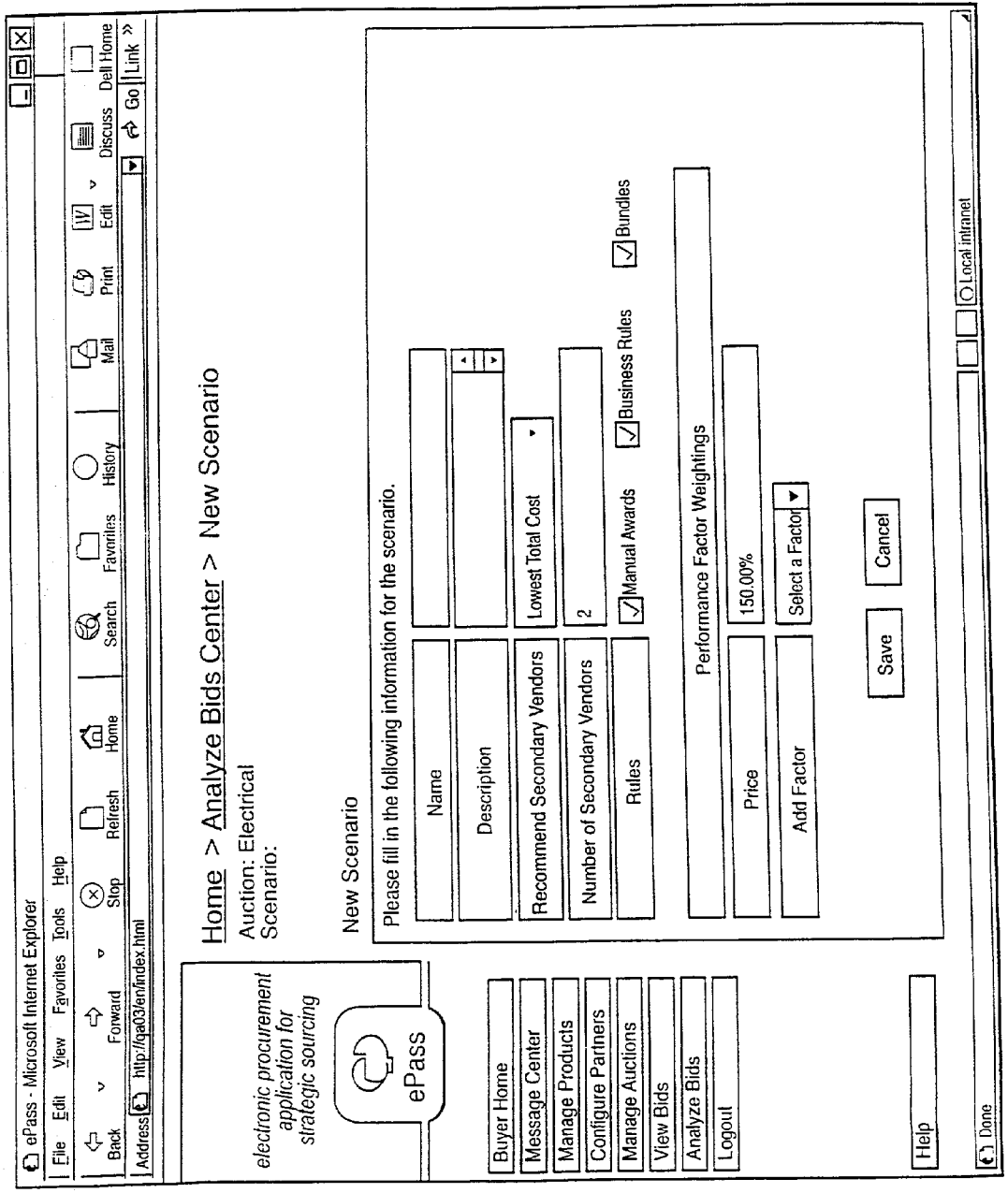
FIG. 22 is a web page accessible from the web page of FIG. 21 for soliciting values of parameters defining a scenario.

FIG. 22 shows a web page with a blank form for creating a scenario. To create a scenario, the buyer enters the name and an optional description of the scenario in the identifying text boxes. The buyer then specifies additional buyer constraints on the bids. These constraints include the application of selected business rules, the recognition of bundled bids, and the weighting of performance attributes.

The "Manual Awards" check box of FIG. 22, when checked, instructs the optimization engine 76 to allow the buyer to manually specify certain awards and to include in the optimal award schedule only those requisitioned items that have not been manually awarded to any supplier. This option of manually specifying certain awards may be necessary, for example, if a buyer has a pre-existing requirements contract with a supplier.

The "Bundles" check box, when checked, instructs the optimization engine 76 to include bundled bids in determining the optimal award schedule. When left unchecked, the optimizer ignores all bundled bids.

The "Business Rules" check box, when checked, instructs the optimizer to apply business rules when determining the optimal award schedule. Although many types of business rule can be defined, the illustrated embodiment of the auction management software supports four types of business rules. These are:

(1) rules that limit the number of units of a logical item to be supplied by any one supplier;
(2) rules that limit the number of suppliers who will be selected to supply any one logical item;
(3) rules that limit the monetary value of business awarded to any one supplier; and
(4) rules limiting the performance cost (defined below in the discussion on performance attributes) incurred by any one supplier.

As used above, the verb "limit" includes imposing an upper limit, a lower limit, or both an upper limit and a lower limit.

A business rule can be applied throughout the auction, only within a requisition, only within a category or subcategory within that requisition, or only to specific items. In addition, a business rule can be applied to all suppliers or to only selected clusters of suppliers.

Examples of business rules include:

(i) business rules requiring that a specified percentage of awards be awarded to locally based or domestic suppliers, to small suppliers, to environmentally aware suppliers, or to suppliers having some other characteristic or combination of characteristics; and
(ii) business rules limiting the buyer's exposure to the risk of failure by any one supplier, for example by requiring that no supplier satisfy more than a specified fraction of a requisition or by requiring that satisfaction of a requisition be spread among a specified number of suppliers.

The auction management software provides a sequence of web pages that guide the buyer in defining a business rule. Each business rule is defined by its type, the logical items to which it applies, and the suppliers to which it applies.

Figure 23:
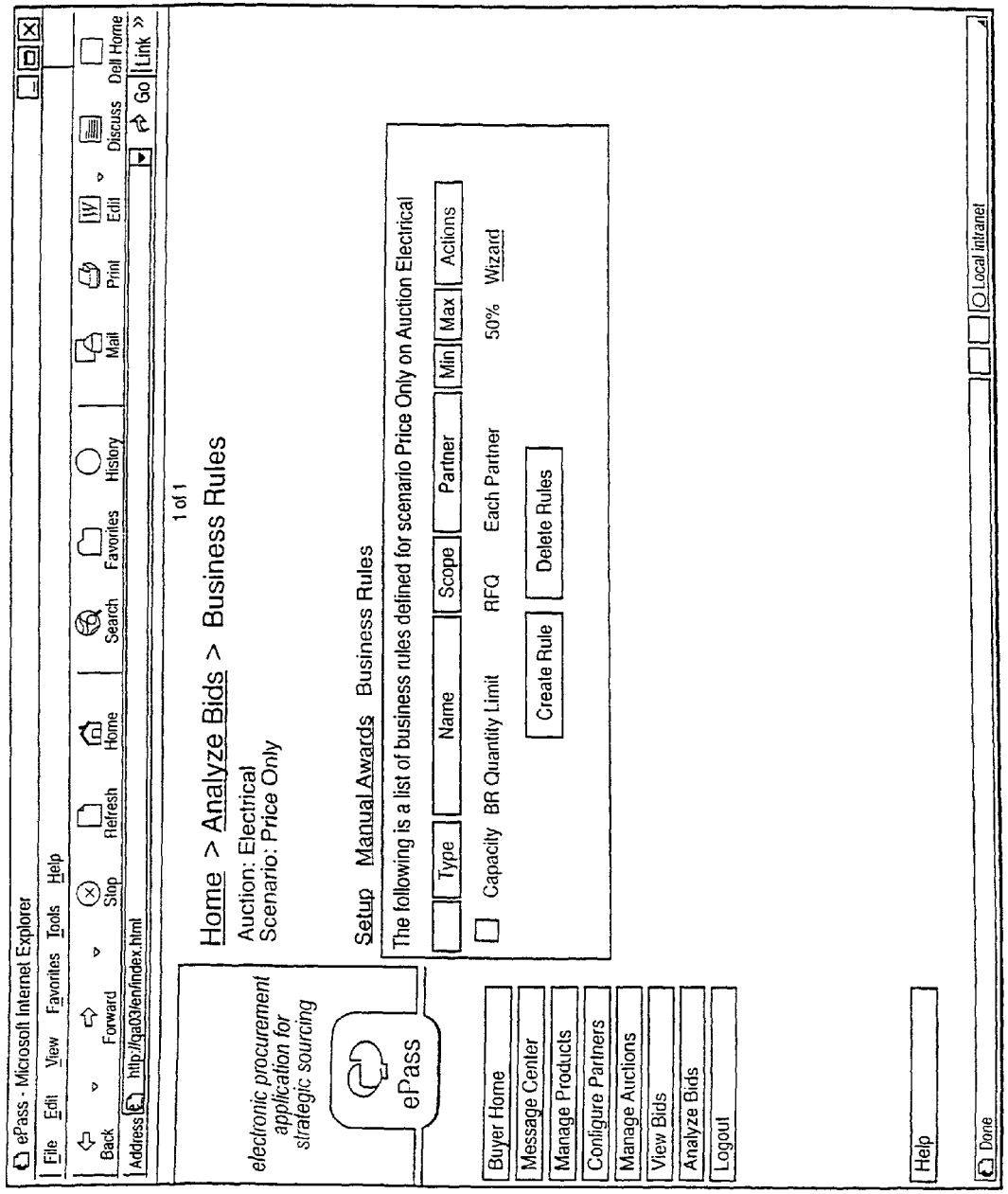
FIG. 23 shows a web page for defining business rules within a scenario.

FIG. 23 shows a web page to be used for defining new business rules or for editing new business rules. The illustrated web page, which is accessible from the analysis center 110, lists all business rules defined for a particular scenario, in this case a scenario called "Price Only," of the auction called "Electrical." The illustrated web page also provides buttons for creating and deleting business rules and a "Wizard" link for editing an existing business rule. Since the process of creating a business rule and editing a business rule are similar, we describe in detail only the process of editing a business rule.

Figure 24:
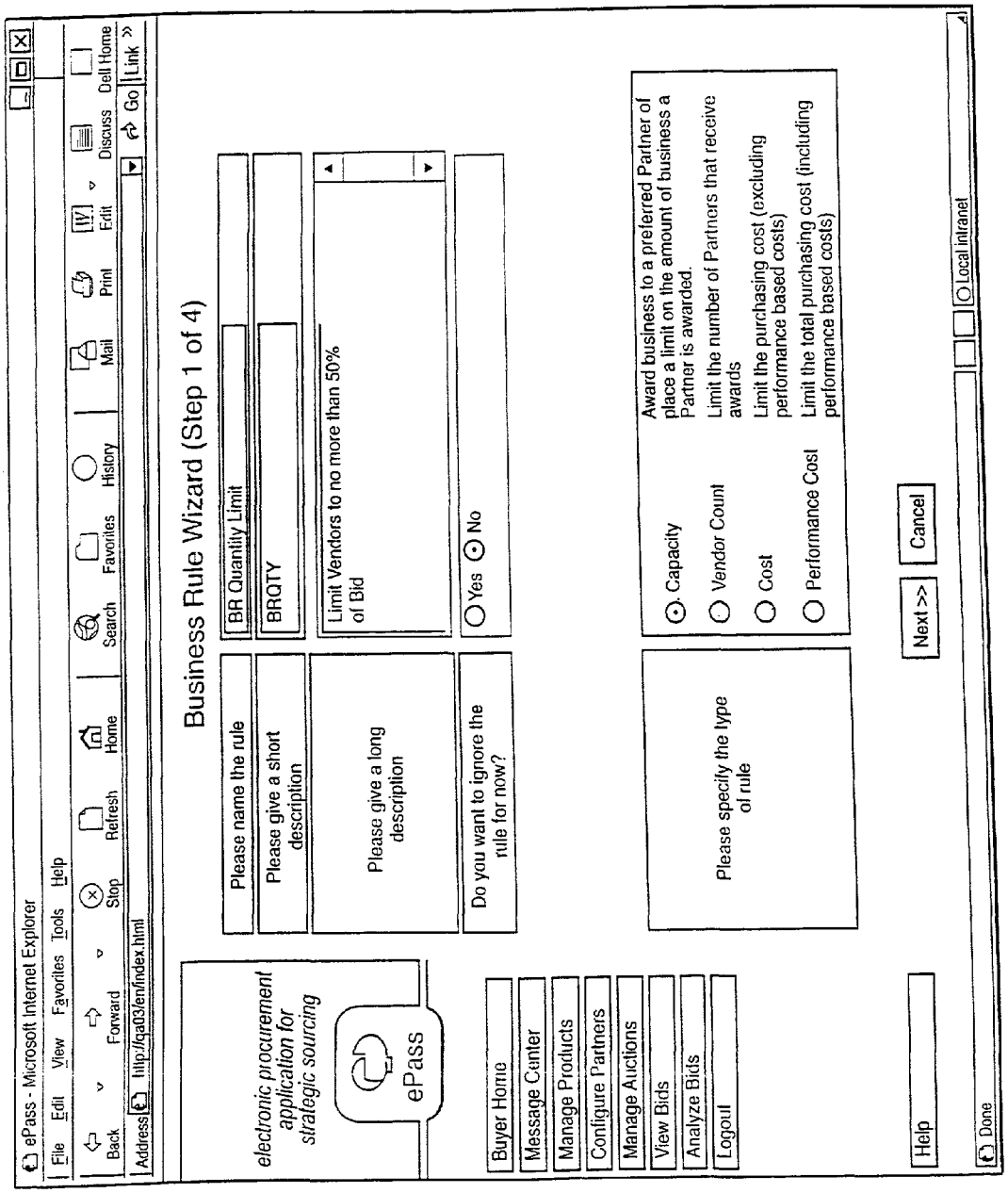
FIG. 24 is a web page requesting information about the type of business rule to be defined.

FIG. 24 shows the first web page of a sequence of web pages accessible by clicking on the "Wizard" link. A similar web page is accessible from the "Create Rule" button of FIG. 23. The web page of FIG. 24 includes fields for identifying the business rule, a field for selectively disabling the business rule, and radio buttons for defining the type of business rule.

Figure 25:
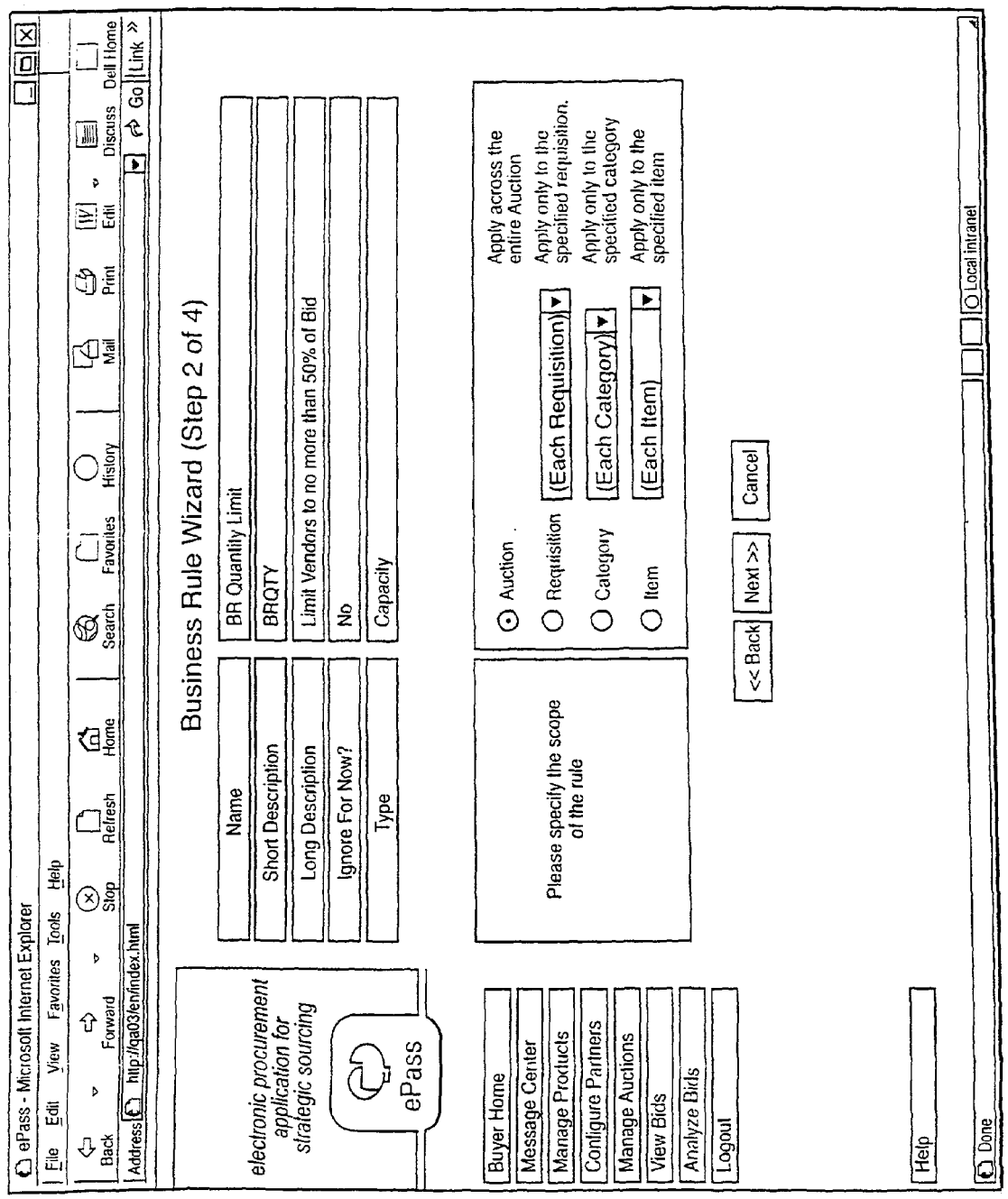
FIG. 25 is a web page requesting information about the scope of the business rule to be defined.
Figure 26:
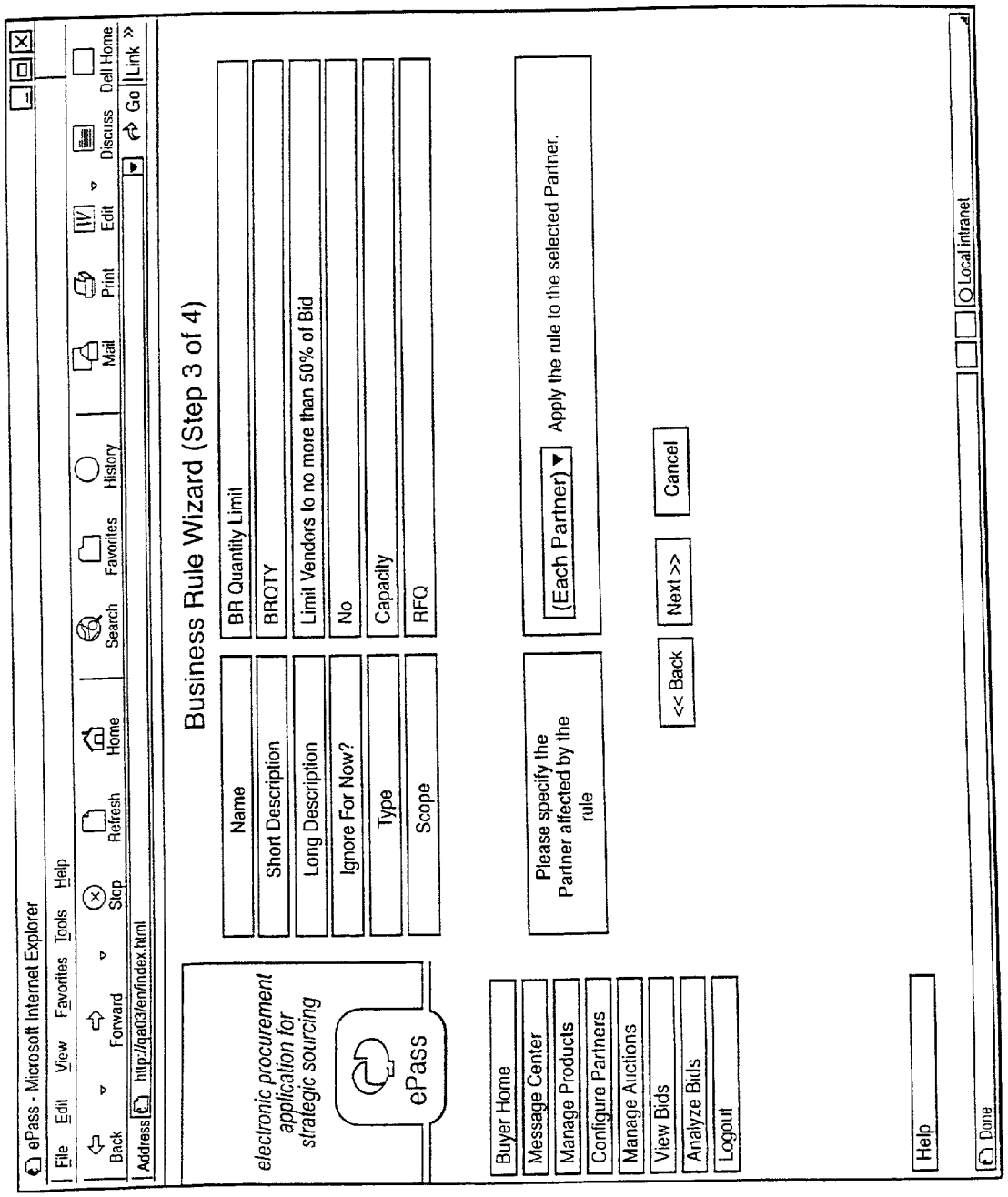
FIG. 26 is a web page for defining the suppliers to which a business rule applies.

The second and third web pages in the above sequence of web pages are shown in FIG. 25 and FIG. 26. These web pages enable the buyer to define the scope of the business rule in terms of the logical items to which it applies (FIG. 25) and in terms of the suppliers (also referred to as "partners") to which it applies (FIG. 26).

Figure 27:
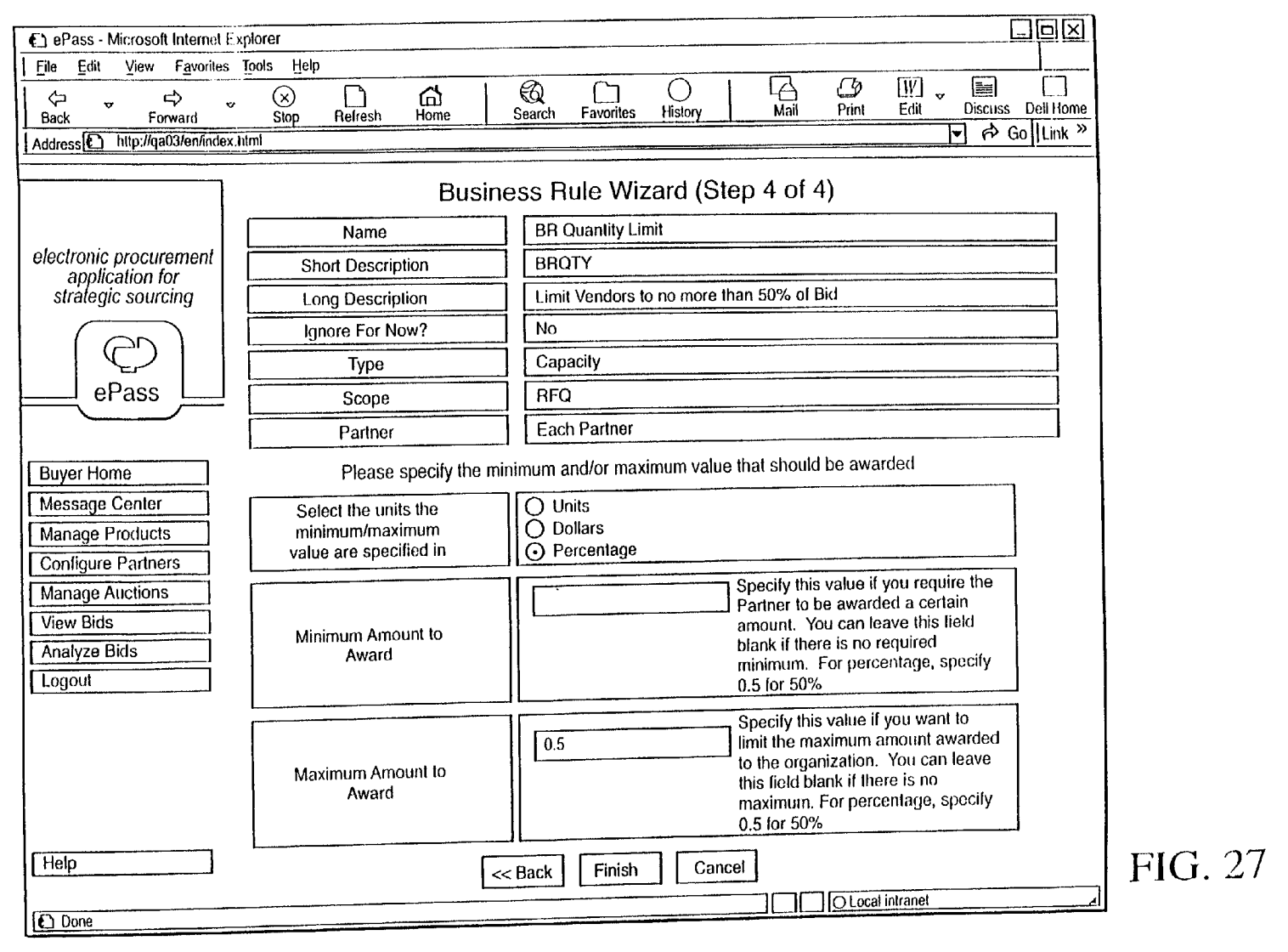

Depending on the type of business rule selected in FIG. 23, certain numerical limits may need to be defined. The buyer defines these in the last web page of the sequence, shown in FIG. 27.

Figure 28:
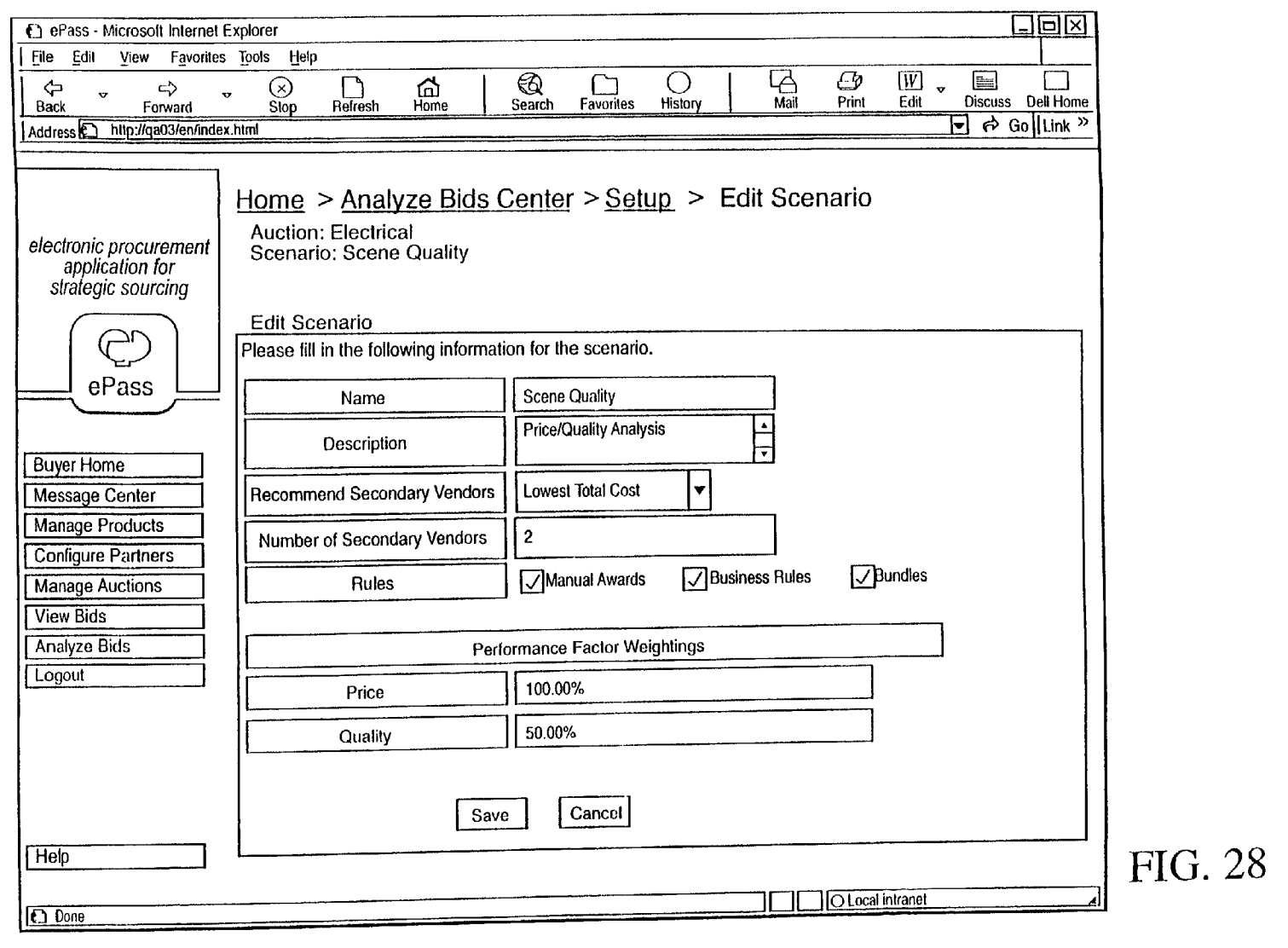

The web page of FIG. 22 also provides the buyer with the option of creating a scenario in which values of selected performance attributes are considered when determining the optimal award schedule. This enables the optimization engine 76 to accommodate factors other than price when determining an optimal award schedule. As an example, FIG. 28 shows a web page, accessible from the web page of FIG. 22, in which the buyer has indicated that for a particular scenario called "Scene Quality," quality is only half as important as price in determining the optimal allocation of awards.

The values of the selected performance attributes and the weights assigned to those attributes by the buyer, interact to generate a performance penalty. The optimization engine 76 treats this performance penalty as a cost to be added to a supplier's bid to determine the true cost of accepting that supplier's bid. The magnitude of the performance penalty thus depends on the values of the performance attributes weighted by a measure of how important the buyer considers those performance attributes to be.

As an example, consider a supplier who offers to supply an item for $100. Suppose the supplier historically provides mediocre products and has difficulty delivering them on time. As a result of its past performance, suppose that a rating service has assigned it a quality performance attribute of 70% and a punctuality attribute of 60%. Now suppose that in a particular scenario, the buyer considers quality to be more important than prompt delivery and that as a result, the buyer has assigned scenario weights 20% and 40% to quality and delivery, respectively.

To evaluate the performance cost, the optimizer first calculates the individual performance penalties due to each performance attribute. In this example, the penalty rate for the quality attribute is the difference between 100% and 70%, or 30%. The scenario weight for quality is 20%. The weighted penalty for quality is thus their product, 6%. Similar reasoning for the punctuality attribute results in a weighted penalty of 16%. The total performance penalty is their sum, or 22%. This is the factor by which the supplier's actual bid must be increased to penalize it for its mediocre product quality and punctuality. Hence, for purposes of bid analysis, the optimization engine 76 will treat the cost of accepting the supplier's $100 bid as being $122.

Figure 29:
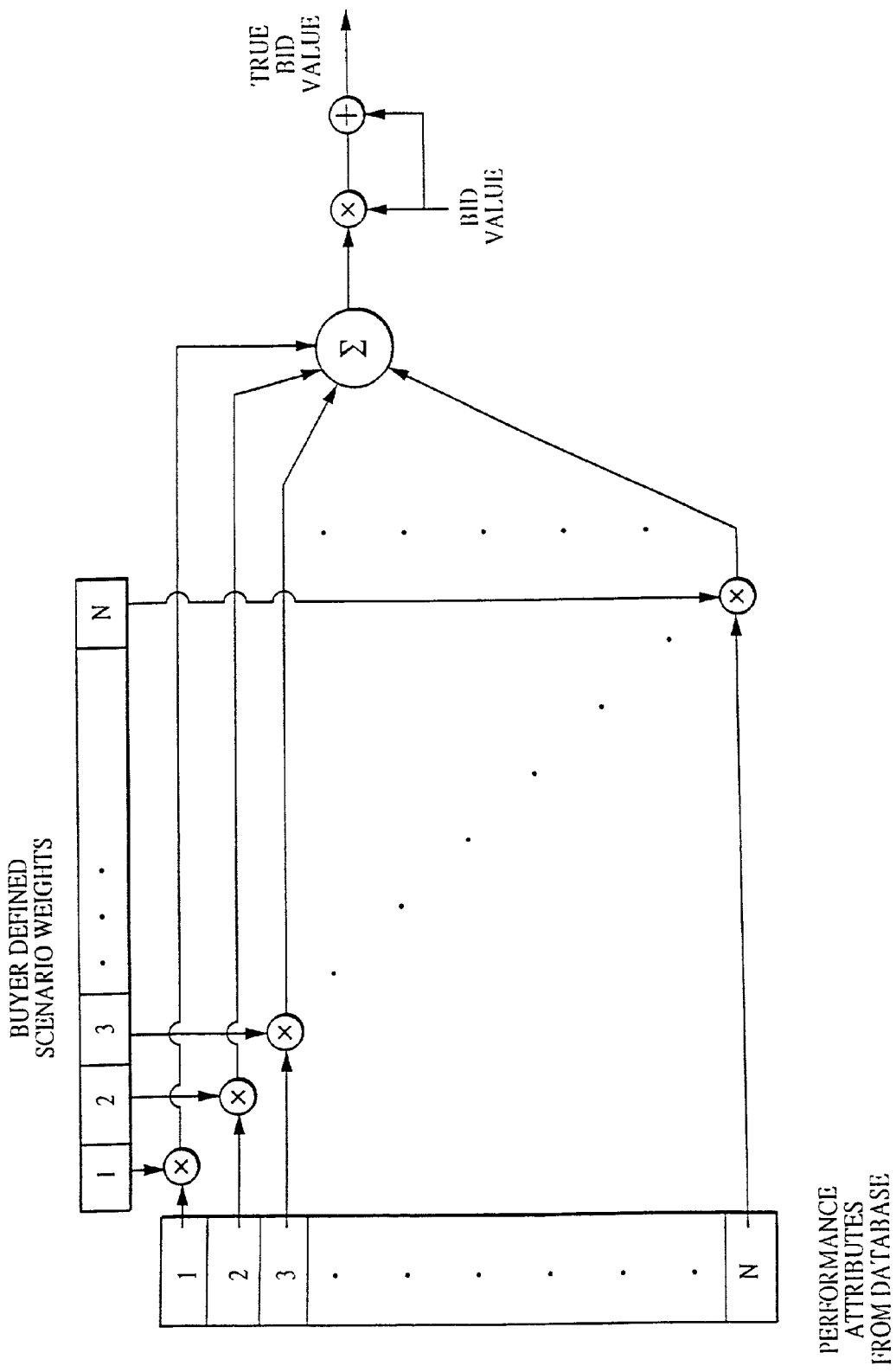
FIG. 29 is a signal flow representation of the manner in which a performance penalty is calculated on the basis of performance attributes and the importance of those attributes to the buyer.

FIG. 29 summarizes the foregoing method of penalizing a supplier for poor performance by augmenting its bid with a performance penalty. As is apparent from that figure, the performance penalty depends on an inner product of two vectors:
  (1) a vector of performance attributes that stays constant from one scenario to the next; and
  (2) a vector of scenario weights assigned to the performance attributes by the buyer for a particular scenario.

Once the buyer defines the scenario, the optimization engine 76 has all data necessary to determine an optimal award schedule. The optimization engine 76 does so by minimizing an objective function subject to the buyer and seller constraints. For each supplier, the objective function takes into account the price offered by that supplier and a penalty associated with the supplier's performance in any buyer-specified performance attributes.

FIG. 30 shows the objective function that is minimized by the optimization engine 76 in a particular scenario. The following parameters in the objective function are associated with supplier constraints and are therefore constant over all scenarios:

| | |
|---|---|
| $c_i^{b(s)}$ | This is the unit price for item i offered by supplier s in that supplier's conventional bid b(s). |
| $c_i^{d(s)}$ | This is the unit price allocated to item i offered by a supplier s in that supplier's bundled bid d(s). This price is determined from $c^{d(s)}$, the price of the bundled bid d(s) offered by the supplier, $c_i^h$, the historical cost of item i as determined from previous bids, and $a_i^{d(s)}$, the number of units of item i offered in the bundled bid, by using the following formula: $$c_i^{d(s)} = c^{d(s)} \left[ \frac{c_i^h \cdot a_i^{d(s)}}{\sum_{i \in d(s)} c_i^h \cdot a_i^{d(s)}} \right]$$ |
| $f_i^{b(s)}$ | This is the fixed charge incorporated by supplier s into a conventional bid b(s) for item i. |
| $f^{d(s)}$ | This is the fixed charge incorporated by supplier s into a bundled bid d(s). |
| $D_{s,bvd}^h$ | This is the value of the business-volume discount offered by supplier s when the amount spent purchasing qualifying items belonging to the discount set bvd falls within an interval defined by the volume threshold h. |
| $I_{s,bvd}^h$ | This is a binary indicator-variable that is equal to 1 if the amount spent purchasing qualifying items belonging to the discount set bvd falls within an interval defined by threshold h and equal to 0 otherwise. |
| $r_{k,i}^s$ | This is the rank of supplier s in performance attribute k for item i. |

The following parameter in the objective function arises from a buyer constraint that is set as part of defining a scenario:
  $w_{k,i}$ This is the weight assigned by the buyer to performance attribute k for item i.

The summations in the objective function are carried out over the following sets:

| | |
|---|---|
| $s \in S$ | A summation over all suppliers s. |
| $b(s) \in B(S)$ | A summation over all conventional bids b(s) made by supplier s. |
| $d(s) \in D(s)$ | A summation over all bundled bids d(s) made by supplier s. |

-continued

| | |
|---|---|
| i ∈ d(s) | A summation over all items i that are included in a bundled bid d(s). |
| k ∈ K | A summation over all performance attributes k. |
| i ∈ I | A summation over all items i. |
| h ∈ SEG(bvd) | A summation over all segments that make up a business-volume discount offered by supplier s. |
| bvd ∈ BVD(s) | A summation over all discount sets BVD(s) of the business-volume discounts offered by supplier s. |

Figure 31:
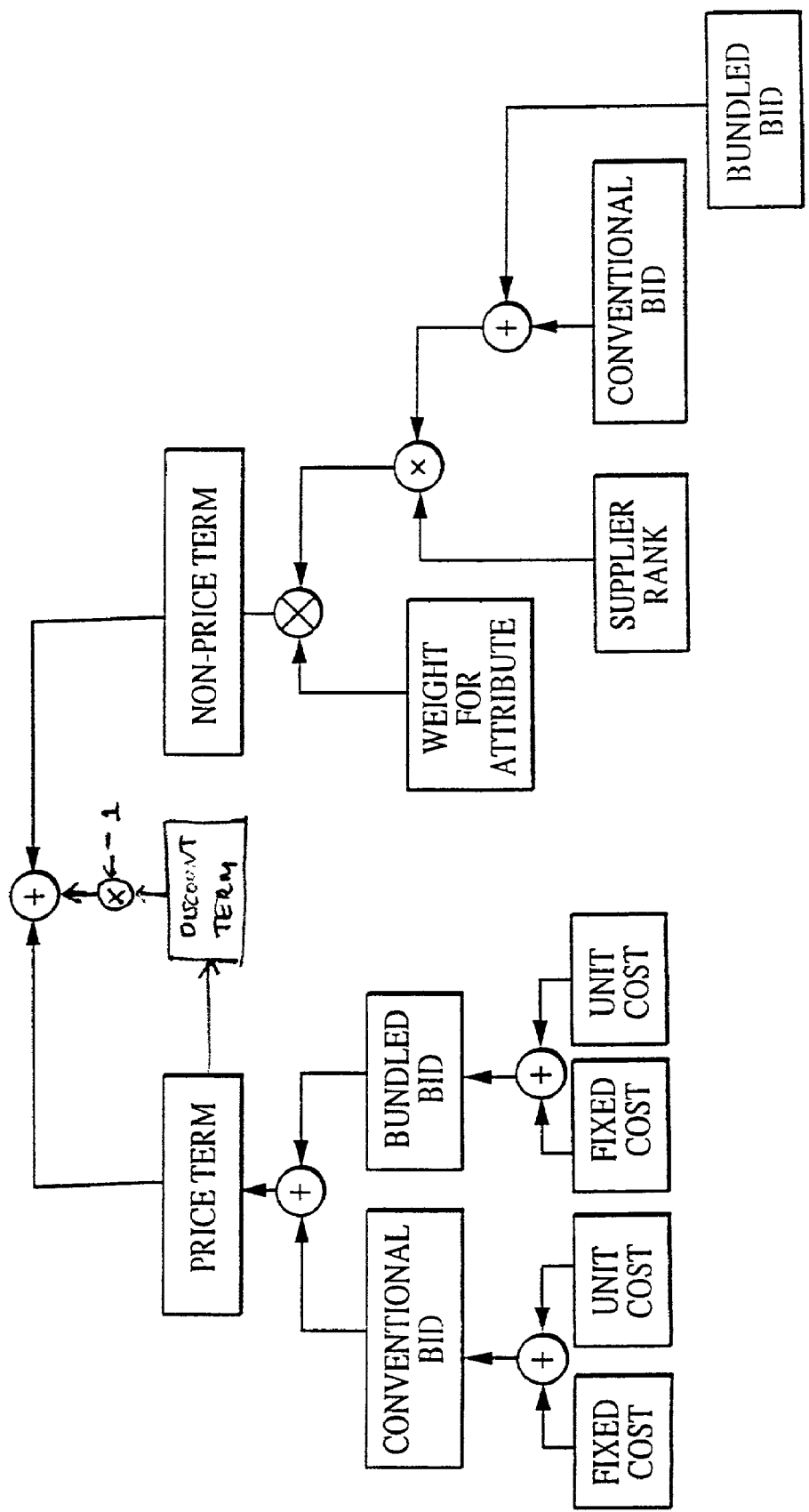
FIG. 31 is a signal flow representation of the objective function of FIG. 30.

FIG. 31 provides a schematic illustration of the significance of the various terms incorporated into the objective function of FIG. 30. The objective function is formed by summing a price term that depends on a supplier's bid and a penalty term that depends on non-price factors associated with that supplier, such as the supplier's performance attributes, and a measure of how important the buyer considers those performance attributes to be. A business-volume-discount term, the value of which depends in part on the value of the price term, is then subtracted from the resulting sum.

The price term is the sum of that supplier's conventional bids for an item and the price attributable to that item from any bundled bids that include that item. In either case, the price incorporates both a unit cost per item and a fixed cost for accepting that bid.

The penalty term, which can change from one scenario to the next, is formed by weighting the supplier's offer price for an item by a quantity that depends on the values of all the performance attributes associated with that item and with that supplier. This is then weighted again by a quantity indicative of how important those performance attributes are to the buyer.

The business-volume discount term is formed by summing all business-volume discounts that are available from all suppliers. These business-volume discounts contribute to the sum only if all the constraints set forth in FIGS. 35-36 are met. Whether these constraints are met depends in part on the value of the price term and how the items to be purchased or distributed among the discount sets defined by each supplier. The constraints shown in FIGS. 35-36 ensure that the business-volume resulting from the purchase of qualifying items is such that a business-volume discount is triggered and that the marginal volume associated with the purchase of any qualifying item is allocated toward triggering only one business-volume discount.

To minimize the objective function shown in FIG. 30, the optimization engine 76 varies four sets of decision variables. These are:

| | |
|---|---|
| $X^{b(s)}$ | is a binary variable that is set to 1 if the conventional bid b(s) of supplier s is to be awarded, either in whole or in part. Otherwise, it is set to 0. |
| $Z^{d(s)}$ | is a binary variable that is set to 1 if the bundled bid d(s) of supplier s is to be awarded. Otherwise, it is set to 0. |
| $x_i^{b(s)}$ | is the number of units of item i to be purchased from supplier s under the terms of conventional bid b(s). |
| $z_i^{d(s)}$ | is the number of units of item i to be purchased from supplier s under the terms of bundled bid d(s). This is given by the product of the number of bundles and the number of items per bundle, or $z^{d(s)} \cdot a_i^{d(s)}$ where $z^{d(s)}$ is the number of bundles d(s) to be purchased from supplier s. |

The objective function of FIG. 30 is minimized subject to constraints shown in FIGS. 32-33. These constraints are as follows:

Constraints (1) and (2) in FIG. 32 ensure that the number of units of each item, when summed across all suppliers, is within the limits defined by the buyer. Note that constraints (1) and (2) have a first term for the conventional bids and a second term for the bundled bids. In constraint (1), $Q_i^u$ represents the maximum number of units of item i required by the buyer. In constraint (2), $Q_i^l$ represents the minimum number of units of item i required by the buyer. In constraints (1) and (2), summation is carried out only over those bids that include item i.

In some cases, the buyer may prefer that several different suppliers participate in the satisfaction of one requisition. For example, in purchasing oil, it may be prudent to select several globally dispersed suppliers to avoid a shortfall caused by local political instability. Conversely, when too many suppliers participate in satisfaction of a requisition, the administrative overhead can become onerous. A buyer may therefore define a business rule that limits the number of suppliers that participate in the satisfaction of a requisition.

Constraints (3)-(6) cooperate to enforce limitations related to the number of suppliers selected to supply items. The variable $Y_g^s$ in constraints (3)-(6) is a binary variable whose value is 1 when supplier s is selected to supply at least one item from group g and 0 otherwise. The summations shown in constrains (3) and (4) are over those items belonging to a group g. A group g of items is analogous to a bundle of items, except that a group is defined by the buyer rather than by the supplier. As an example, a buyer for a hotel may specify a requisition for 200 face towels, 100 bath towels, and 150 hand towels. Each face towel, bath towel, or hand towel would be an item. The buyer may then define a group, called "towels," that consists of 450 items, namely all face towels, all bath towels, and all hand towels.

Constraints (3) and (4) correlate values of $Y_g^s$ with values of $x_i^{b(s)}$ and $z_i^{d(s)}$ for all items i in group g. This is because if either $x_i^{b(s)}$ and $z_i^{d(s)}$ is positive for at least one item in the group, then $Y_g^s=1$. Otherwise, $Y_g^s=0$. The parameter $M_g$ is the maximum number of items from group g that can be supplied by any one supplier. In constraints (3) and (4), the inner summation is carried out only over those bids that include item i.

If a buyer were to require that at least two suppliers satisfy the requisition for the group "towels," feasible solutions could cut across items. For example, supplier 1 might supply 100 face towels, 50 bath towels, and 75 hand towels while supplier 2 would supply the remainder. Alternatively, feasible solutions could cut between items. For example, supplier 1 might supply all 200 face towels and supplier 2 would then supply all hand and bath towels.

In other cases, a buyer may prefer to impose constraints on the number of suppliers selected from a cluster of suppliers. For example, a buyer may define a cluster of suppliers in terms of political subdivisions such as states or municipalities. A supplier would then be a member of that cluster if it had a principal place of business within that political subdivision. The buyer might then define a business rule specifying that at least one award be made to a supplier from each political subdivision, or that no more than N awards be made to suppliers from any one political subdivision.

Constraints (5) and (6) in FIG. 32 are concerned with enforcing a business rule specifying a minimum or maximum number of suppliers belonging to a particular cluster that are selected to supply items from a particular group g. A special and limiting case of constraints (5) and (6) is one in which a cluster t includes all suppliers who have submitted bids and a group g represents the entire requisition.

In constraints (5) and (6), $MaxN_g^t$ represents the maximum number of suppliers from cluster t that can be selected to supply items from group g. Conversely, $MinN_g^t$ represents the minimum number of suppliers from cluster t that can be selected to supply items from group g. In constraints (5) and (6), summation is carried out only over those groups and clusters to which the business rule applies.

In still other cases, a buyer may prefer to ensure that a particular supplier or cluster of suppliers supplies a number of items within a specified range. For example, a buyer concerned with prompt delivery of at least N units of an item may group all suppliers within a twenty-mile radius into a single cluster. That buyer could then specify, as a business rule, that at least N units of that item be obtained from suppliers belonging to that cluster.

Constraints (7) and (8) in FIG. 33 are concerned with enforcing a business rule that specifies a minimum and maximum number of items obtained from suppliers belonging to any one cluster. In those constraints, $MaxQ_g^t$ represents the maximum number of items from group g that can be awarded to suppliers from cluster t. Conversely, $MinQ_g^t$ represents the minimum number of items from group g that can be awarded to suppliers from cluster t. In constraints (7) and (8), summation is carried out only over those groups and clusters to which the constraints apply.

In some cases, a business rule may limit not the number of units of an item but the dollar value of the transaction. Such a business rule is enforced by constraints (9) and (10) in FIG. 33, which are identical to constraints (7) and (8) with the exception that each term has been multiplied by the appropriate cost per item ($c_i^{b(s)}$ for conventional bids and $c_i^{d(s)}$ for bundled bids). In constraints (9) and (10), $MaxV_g^t$ represents the maximum dollar volume from group g that can be awarded to suppliers from cluster t. Conversely, $MinV_g^t$ represents the minimum dollar volume from group g that can be awarded to suppliers from cluster t. In constraints (9) and (10), summation is carried out only over those groups and clusters to which the constraints apply.

Constraints (11) and (12) in FIG. 34 serve two purposes. First, these constraints correlate the value of $Z^{d(s)}$ with those of $z_i^{d(s)}$. If a bundled bid d(s) is accepted from supplier s (so that $Z^{d(s)}$ and hence $z_i^{d(s)}$ for all items i in d(s) are positive), then $Z^{d(s)}$ is set to one. Conversely, if $Z^{d(s)}$ is set to zero, then all $z_i^{d(s)}$ must be zero. Secondly, these constraints ensure that the number of units of item i awarded to supplier s is between the range specified by the upper and lower limits $u_i^{d(s)}$ and $l_i^{d(s)}$.

Constraints (13) and (14) in FIG. 34 are analogous to constraints (11) and (12) but as applied to conventional bids rather then bundled bids. If a bid b(s) is accepted from supplier s (so that $X_i^{b(s)}$ is positive), then $X^{b(s)}$ is set to one. Conversely, if $X^{b(s)}$ is set to zero, then $x_i^{b(s)}$ must be zero. These constraints then ensure that the number of units of item i awarded to supplier s is between the range specified by the upper and lower limits $U_i^{b(s)}$ and $L_i^{b(s)}$. These limits are specified by the buyer in the course of creating a business rule or by the supplier when specifying the number of items available for sale at a specified price. In constraints (13) and (14), summation is carried out only over those bids that include either a fixed cost or a lower bound on the number of items that can be purchased.

Constraint (15) in FIG. 34 ensures that the amount of item i supplied by supplier s is less than the upper limit $U_i^{b(s)}$. For bids having a lower bound, or for bids in which the supplier has imposed a fixed cost, this constraint is redundant.

Constraint (16) in FIG. 34 ensures that the amount of item i to be supplied by supplier s on the basis of a bundled bid d(s) is non-negative. Constraints (17)-(19) ensure that the variables $X^{b(s)}$, $Y_g^s$ and $Z^{d(S)}$, all of which are defined above, are binary variables that are constrained to be either zero or one.

In constraint (20), summation is carried out over all conventional bids b(s) and all bundled bids d(s) that include the purchase of a qualifying item i that is in a category for which a business volume discount is being offered by supplier s. B(s) and D(s) respectively represent the set of all conventional and bundled bids offered by supplier s; b(s) and d(s) are elements of the sets B(s) and D(s) respectively. First and second threshold variables $H^{U,h}_{s,bvd}$ and $H^{L,h}_{s,bvd}$, represent upper and lower bounds of an interval h associated with a business-volume discount offered by a supplier s on a discount set bvd.

Constraint (20) thus ensures that the business volume resulting from the purchase of qualifying items i falls within at least one segment defined in a business-volume discount offered by a particular supplier. Constraint (28) defines first indicator variables $I_{s,bvd}^h$ associated with each segment h of a business-volume discount offered by supplier s for qualifying items in a discount set bvd.

Constraint (21) sums the first indicator variables over all segments h of a business volume discount offered by supplier s on discount set bvd. Since each summand in constraint (21) can only be 0 or 1, the effect of constraining the sum in constraint (21) to equal 1 is to ensure that only one segment h of the business-volume discount for discount set bvd is ever applied.

In some cases, a supplier may have defined a qualifying item that belongs to two or more discount sets. For example, if a supplier offers a business volume discount on all purchases of garden equipment and also on all purchases of wheeled vehicles, the optimization engine 76 would most likely generate an optimal award schedule in which the purchase of a wheelbarrow contributes toward meeting the volume discount thresholds for both garden equipment and wheeled vehicles.

Constraint (22) is intended to prevent a purchase of an item in a conventional bid b(i) from being allocated toward reaching a threshold in more than one business-volume discount. The set of business-volume discounts toward which purchases of items in a conventional bid b(s) are allocable is referred to as COVEREDBVD(b(s)). The summand, which is defined in constraint (29), is a second indicator variable $J^{b(s)}_{bvd}$, whose function is to indicate whether accepting a bid b(s) from supplier s results in purchases that are applied toward a business-volume discount associated with the discount set bvd. The summation in constraint (22) is thus carried out over all business-volume discounts that are potentially triggered by a purchase of an item in a conventional bid b(s). Since each summand in constraint (22) is either 0 or 1, the effect of constraining the sum in constraint (22) to equal 1 is to ensure that a purchase of an item in a conventional bid contributes toward reaching the threshold in only one of the available business volume discounts offered by supplier s.

Constraint (23) is intended to prevent a purchase of an item in a bundled bid d(s) from being allocated toward reaching a threshold in more than one business-volume discount. The set of business-volume discounts toward which purchases of items in a bundled bid d(s) are allocable is referred to as COVEREDBVD(d(s), i). The summand, which is defined in constraint (30), is a third indicator variable $J^{d(s)}_{I,bvd}$, whose function is to indicate whether accepting a bundled bid d(s) from supplier s results in purchases that are applied to a business-volume discount on the discount set bvd. The summation in constraint (23) is thus carried out over all business-volume discounts that are potentially triggered by a purchase of an item i in a bundled bid d(s). Since each summand in constraint (23) is either 0 or 1, the effect of constraining the sum in constraint (23) to equal 1 is to ensure that a purchase of an item in a bundled bid contributes toward reaching the threshold in only one of the available business volume discounts offered by supplier s.

Constraint pairs (24)-(27) establish a relationship between the decision variables in the objective function of FIG. 30 and the shadow variables used in constraint (20). Each pair of constraints forces a shadow variable to be equal to either 0 or to its corresponding decision variable, depending on the value of either the second or third indicator variables. In each of these constraint pairs, M is a very large number that can be treated as infinity.

In constraint pairs (24) and (25), if the second indicator variable is zero, then the corresponding shadow variables for conventional bids are forced to be zero. Conversely, if the second indicator variable is one, the corresponding shadow variables for conventional bids are set equal to their corresponding decision variables in the objective function of FIG. 30.

Constraint pairs (26) and (27) are identical to constraint pairs (24) and (25) except that they apply to bundled bids instead of conventional bids. In constraint pairs (26) and (27), if the third indicator variable is zero, then the corresponding shadow variables for bundled bids are forced to be zero. Conversely, if the third indicator variable is one, the corresponding shadow variables for bundled bids are set equal to their corresponding decision variables in the objective function of FIG. 30.

The objective function shown in FIG. 30 is then minimized subject to the constraints of FIGS. 32-36. This is achieved in a conventional manner using API calls to the collection of optimization subroutines sold under the trademark CPLEX, as described in connection with FIG. 4. Because the objective function includes binary decision variables, the minimization is carried out using conventional integer programming techniques.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What we claim is:

1. A computer-implemented method for determining an optimal award schedule for satisfying a purchase requisition, the method comprising:
    receiving over a computer network, from each of a plurality of candidate suppliers, a corresponding plurality of bids;
    receiving, from a candidate supplier over said computer network, an explicit offer of a business-volume discount that is triggered when a purchase from the candidate supplier of at least one unit of a first qualifying item and at least one unit of a second qualifying item has an aggregated volume within a defined volume interval; and
    determining by a processor an optimal award schedule comprising an optimal combination of candidate suppliers and a list of items to be ordered from each supplier to at least partially satisfy the purchase requisition utilizing the explicit offer of a business volume discount.

2. The method of claim 1, wherein receiving a business-volume discount offer comprises receiving a business-volume discount offer in which a business-volume discount is triggered on the basis of purchases of items belonging a first category of items and no business-volume discount is triggered on the basis of purchases of items belonging to a second category of items.

3. The method of claim 2, wherein receiving a corresponding plurality of bids comprises receiving, from the at least one candidate supplier, a first bid in which each item recited in the first bid belongs to no more that one item-category.

4. The method of claim 2, wherein receiving a corresponding plurality of bids comprises receiving, from the at least one candidate supplier, a first bid in which at least one item recited in the first bid belongs to both a first item-category and a second item-category.

5. The method of claim 4, wherein determining an optimal award schedule comprises constraining the optimal award schedule such that a purchase of the at least one qualifying item contributes to a business volume discount associated with at most one of the first and second item-categories.

6. The method of claim 1, wherein receiving an offer of a business-volume discount comprises receiving a business-volume discount offer that defines a plurality of volume intervals, each of the volume intervals being associated with a corresponding discount to be offered when the volume of an aggregate purchase of at least two qualifying items from the at least one candidate supplier is within the volume interval.

7. The method of claim 1, wherein receiving an offer of a business-volume discount comprises receiving a business-volume discount offer in which the defined volume interval has a lower bound defined by a volume threshold and no upper bound.

8. A non-transitory computer-readable medium having encoded thereon software for satisfying a purchase requisition, the software comprising instructions for:
    receiving, from each of a plurality of candidate suppliers, a corresponding plurality of bids;
    receiving, from a candidate supplier, an explicit offer of a business-volume discount that is triggered when a purchase from the candidate supplier of at least one unit of a first qualifying item and at least one unit of a second qualifying item has an aggregated volume within a defined volume interval; and
    determining by a processor an optimal award schedule comprising an optimal combination of candidate suppliers and a list of items to be ordered from each supplier to at least partially satisfy the purchase requisition utilizing the explicit offer of a business volume discount.

9. The computer-readable medium of claim 8, wherein the instructions for receiving a business-volume discount offer comprise instructions for receiving a business-volume discount offer in which a business-volume discount is triggered on the basis of purchases of items belonging a first category of items and no business-volume discount is triggered on the basis of purchases of items belonging to a second category of items.

10. The computer-readable medium of claim 9, wherein the instructions for receiving a corresponding plurality of bids comprise instructions for receiving, from the at least one candidate supplier, a first bid in which each item recited in the first bid belongs to no more than one item-category.

11. The computer-readable medium of claim 9, wherein the instructions for receiving a corresponding plurality of bids comprise instructions for receiving, from the at least one candidate supplier, a first bid in which at least one item recited in the first bid belongs to both a first item-category and a second item-category.

12. The computer-readable medium of claim 11, wherein the instructions for determining an optimal award schedule comprise instructions for constraining the optimal award schedule such.

13. The computer-readable medium of claim 8, wherein the instructions for receiving an offer of a business-volume discount comprise instructions for receiving a business-volume discount offer that defines a plurality of volume intervals, each of the volume intervals being associated with a corresponding discount to be offered when the volume of an aggregate purchase of at least qualifying two items from the at least one candidate supplier is within the volume interval.

14. The computer-readable medium of claim 8, wherein the instructions for receiving an offer of a business-volume discount comprise instructions for receiving a business-volume discount offer in which the defined volume interval has a lower bound defined by a volume threshold and no upper bound.

15. The method of claim 1 further comprising imposing, by a party other than a candidate supplier, a private buyer constraint prior to determining the optimal award schedule.

16. The method of claim 15 further comprising changing an imposed private buyer constraint and redetermining the optimal award schedule using the changed private buyer constraint.

17. The method of claim 1 further comprising storing a supplier profile corresponding to a candidate supplier.

18. The method of claim 17 wherein determining an optimal award schedule considers a stored supplier profile corresponding to a candidate supplier.

19. The computer-readable medium of claim 8 further comprising instructions for imposing, by a party other than a candidate supplier, a private buyer constraint prior to determining the optimal award schedule.

20. The computer-readable medium of claim 8 further comprising instructions for storing a supplier profile corresponding to a candidate supplier.

* * * * *